United States Patent Office 3,434,907
Patented Mar. 25, 1969

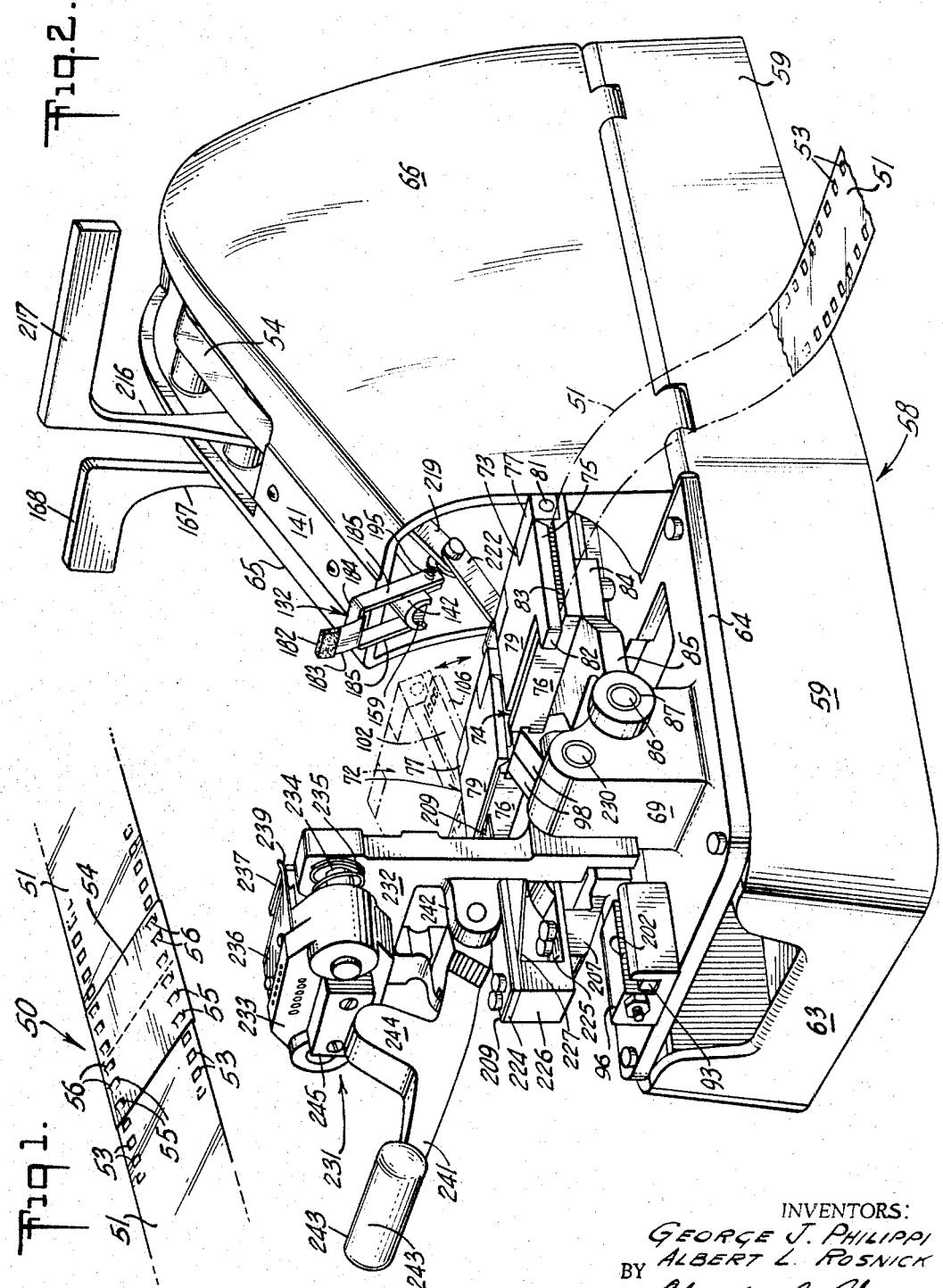

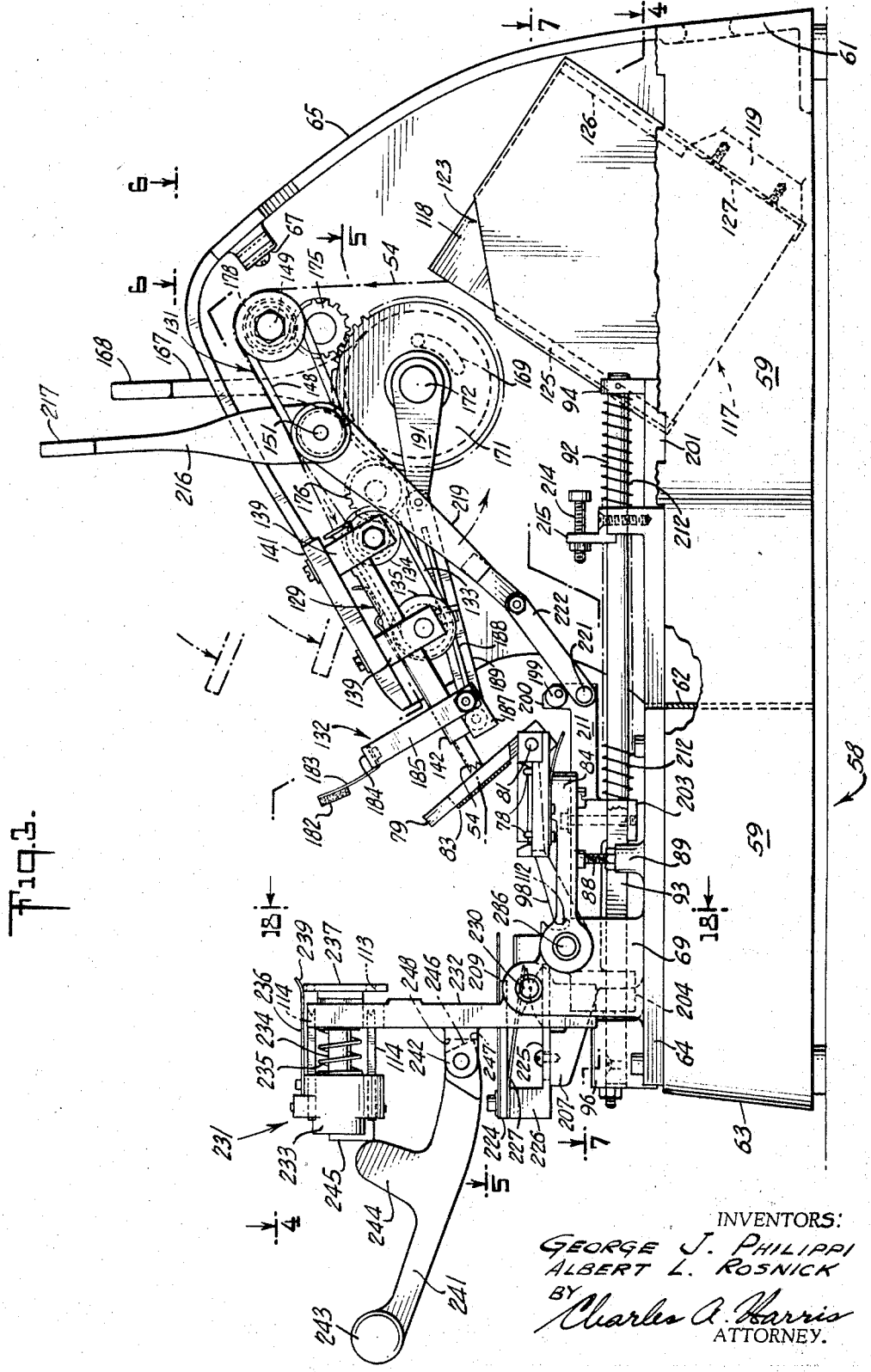

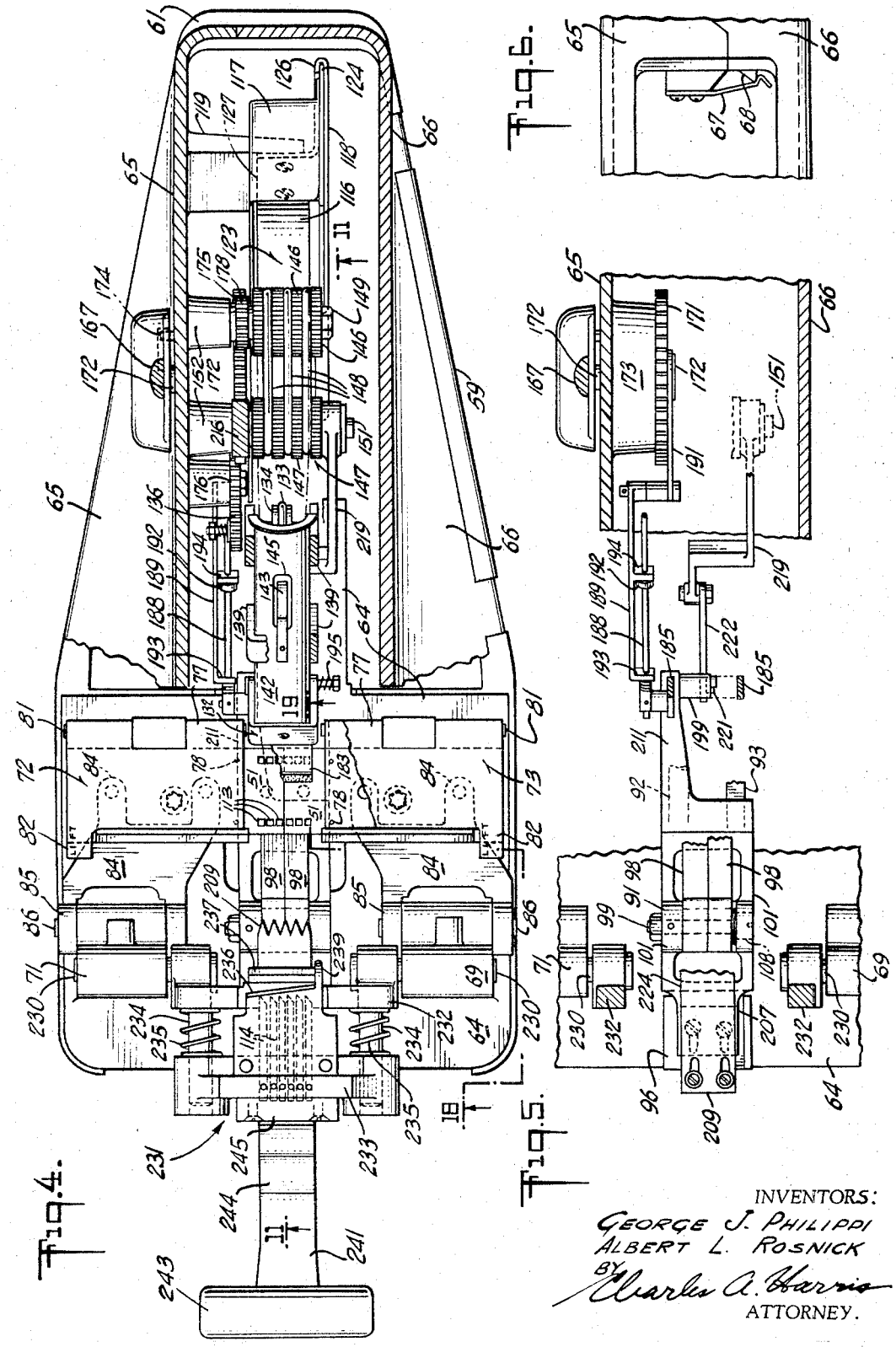

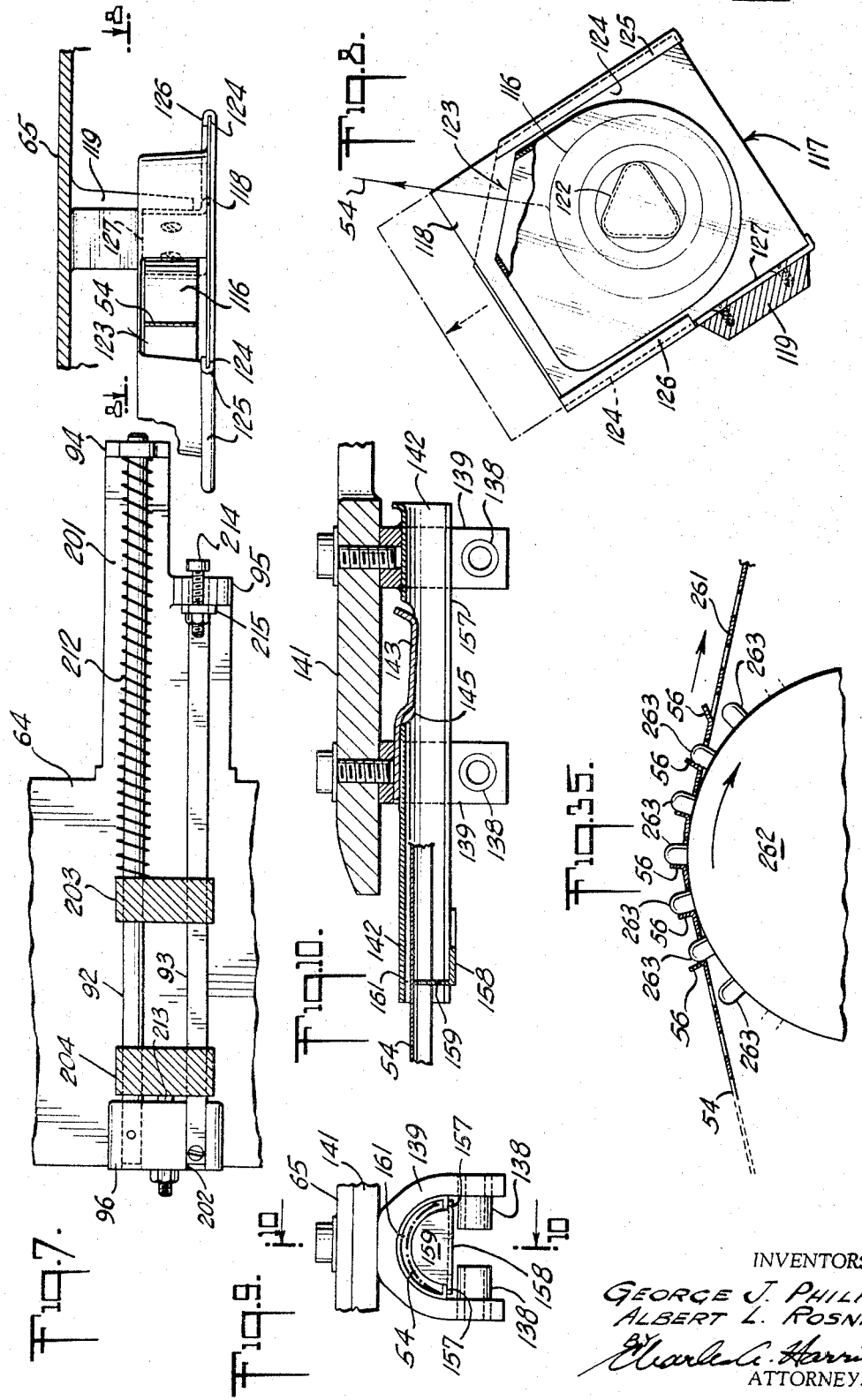

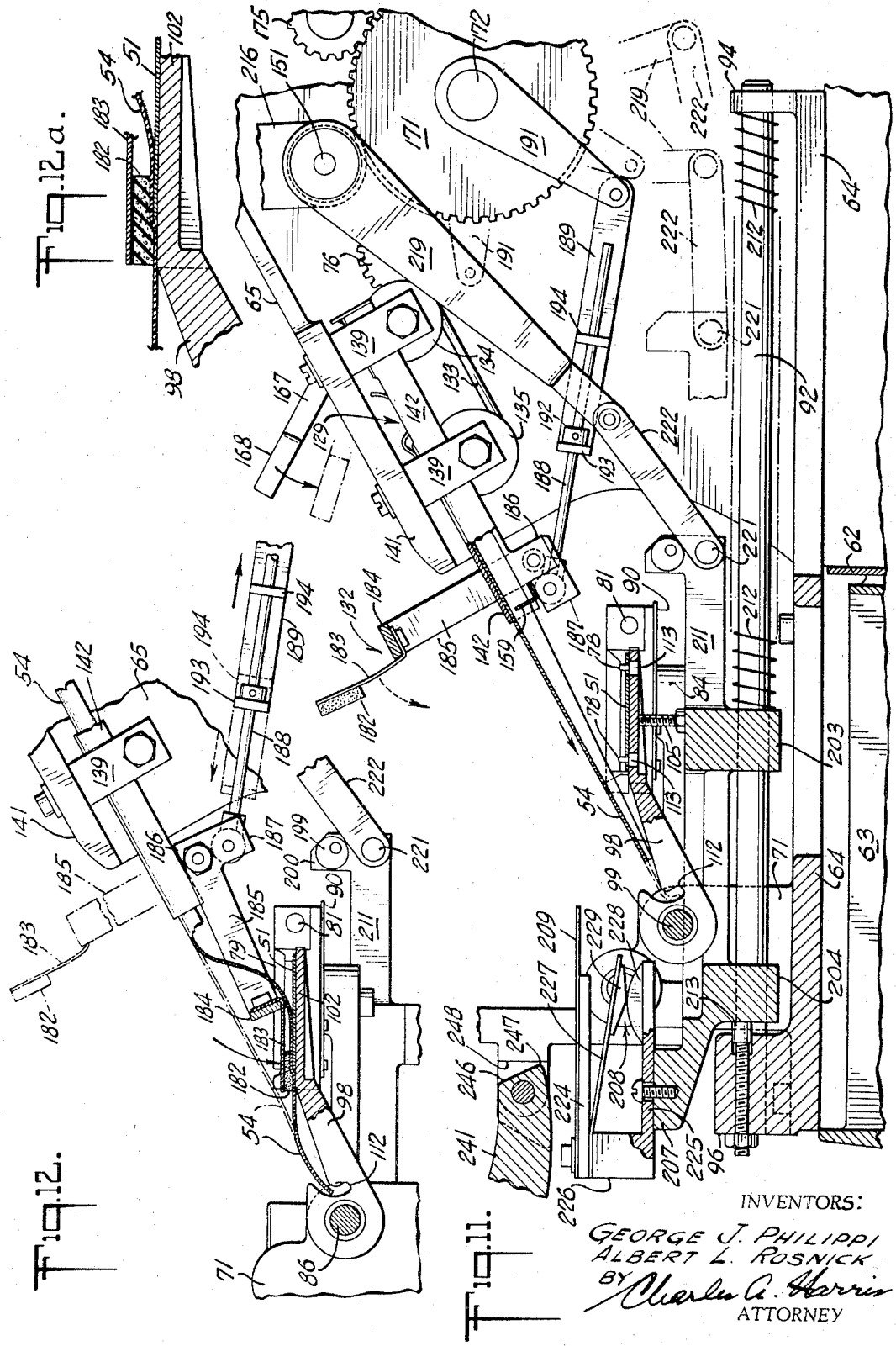

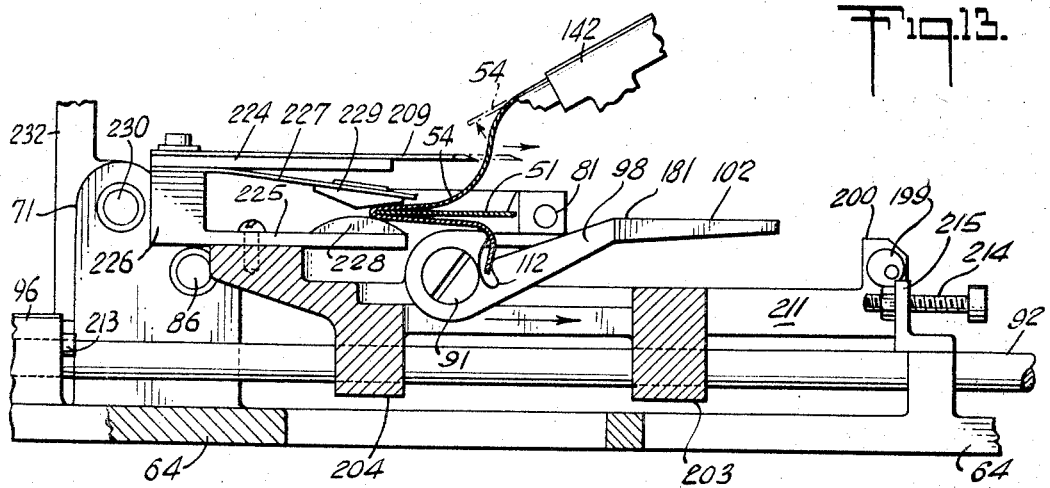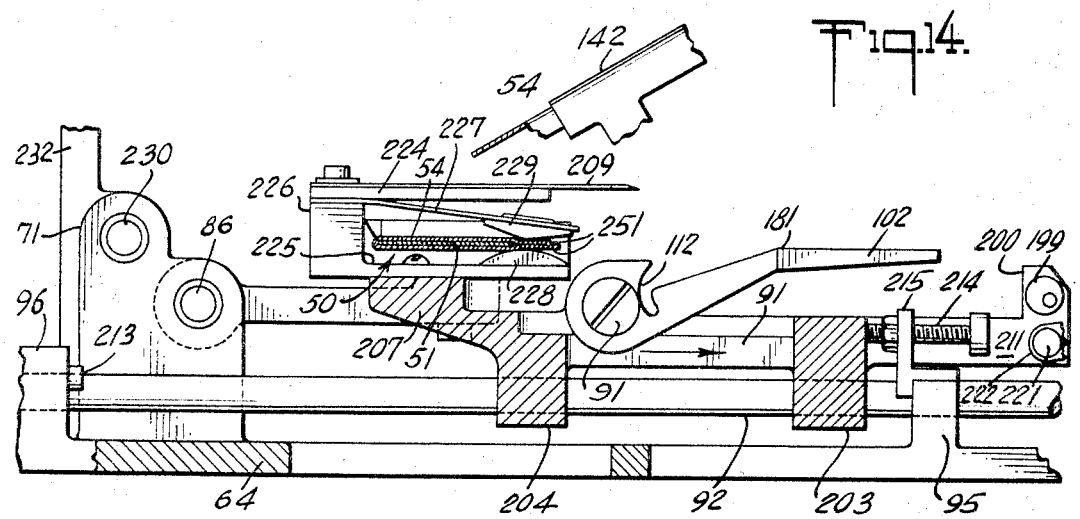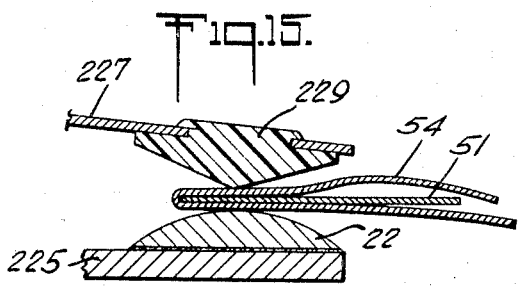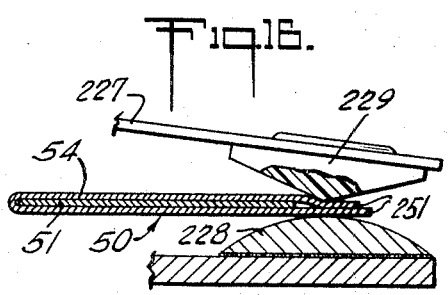

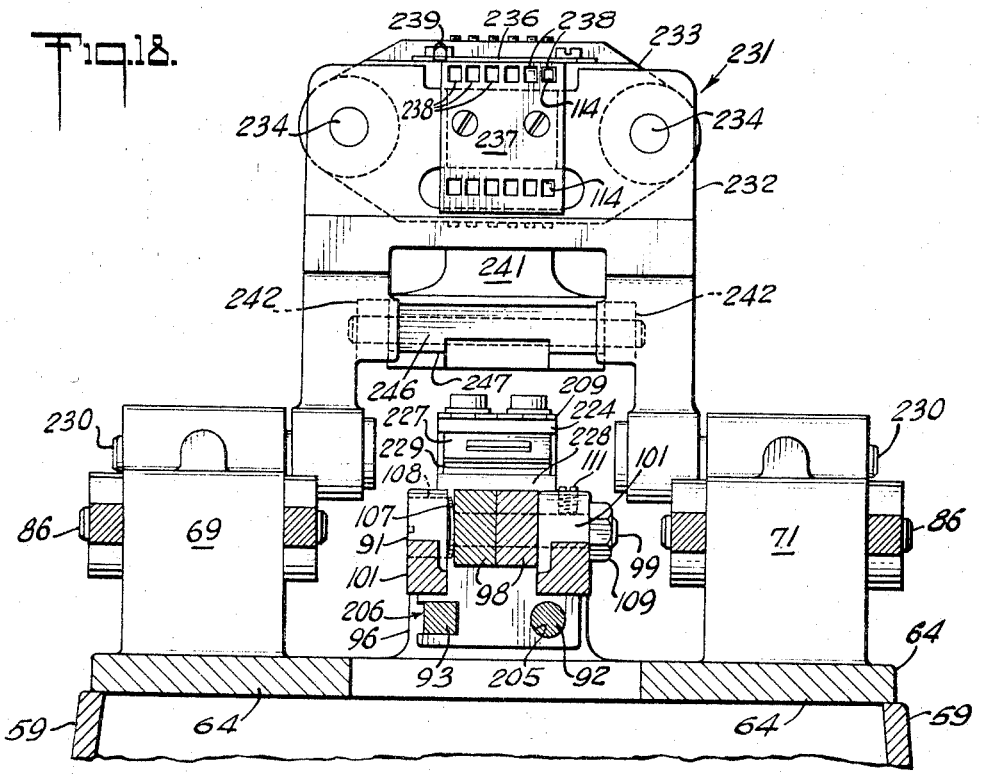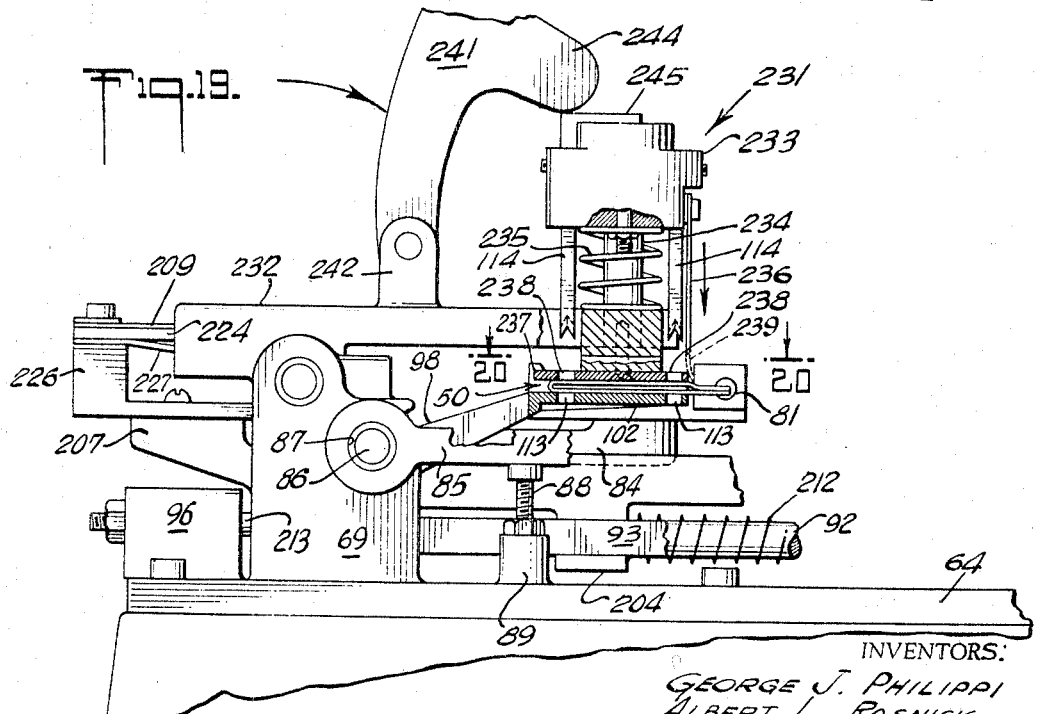

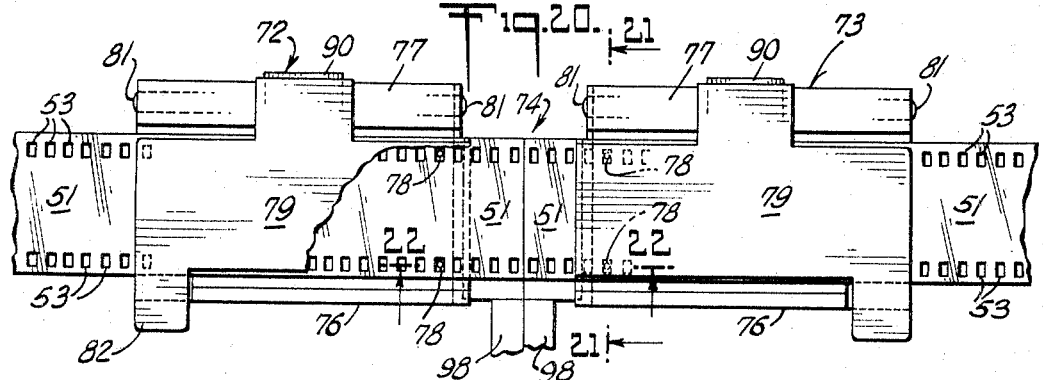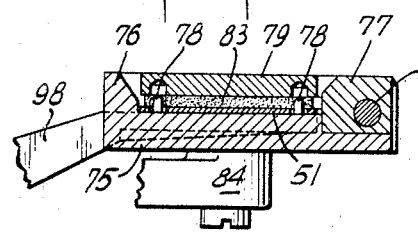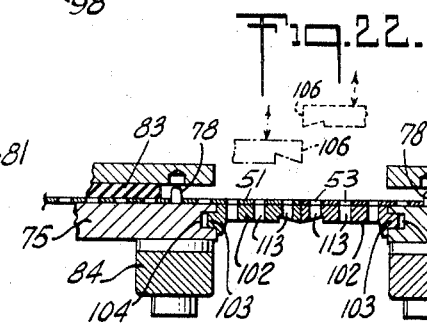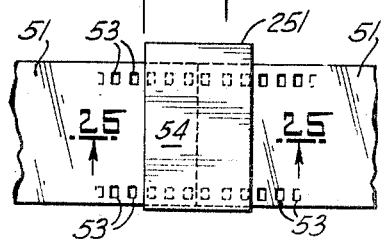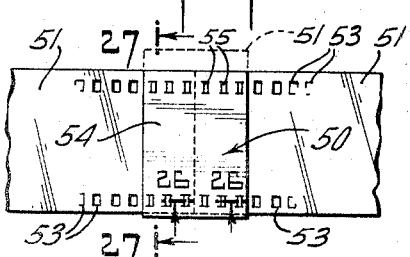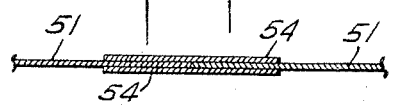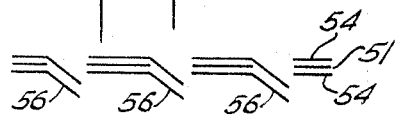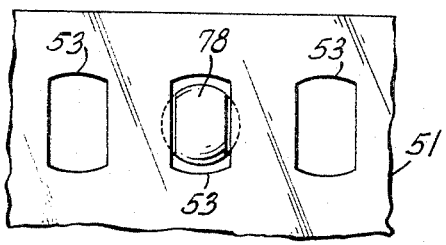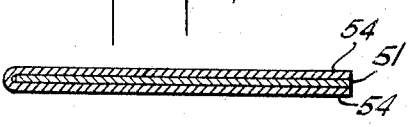

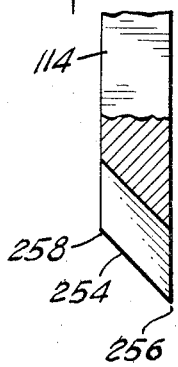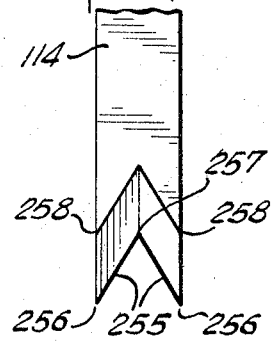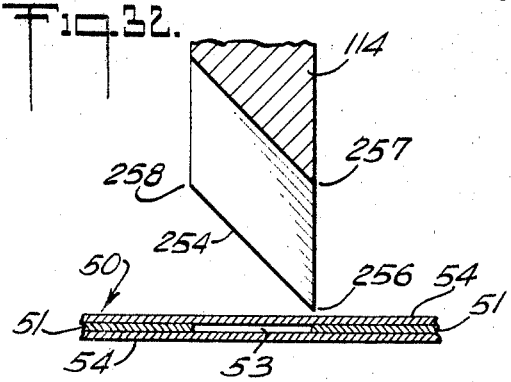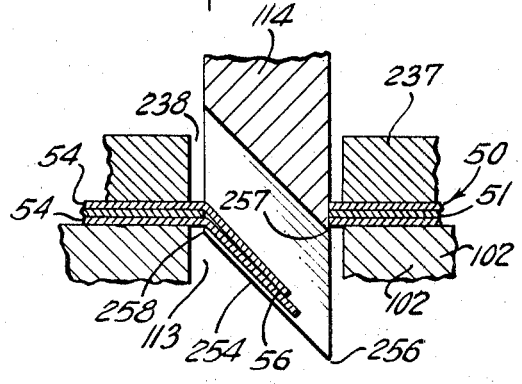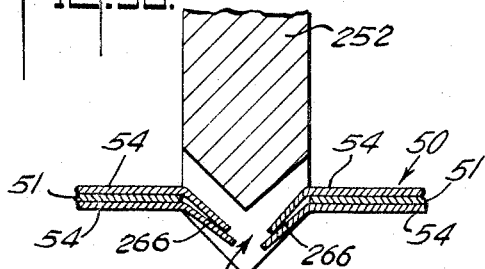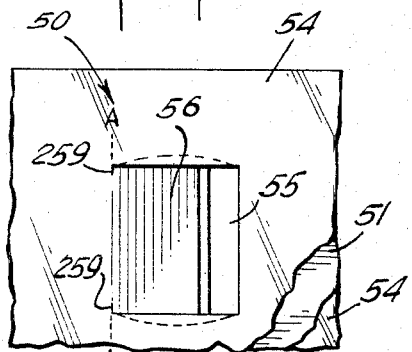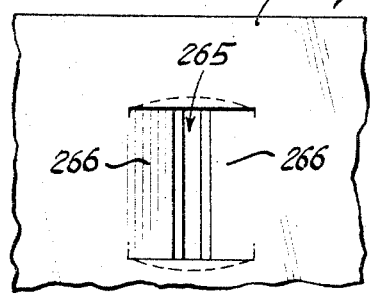

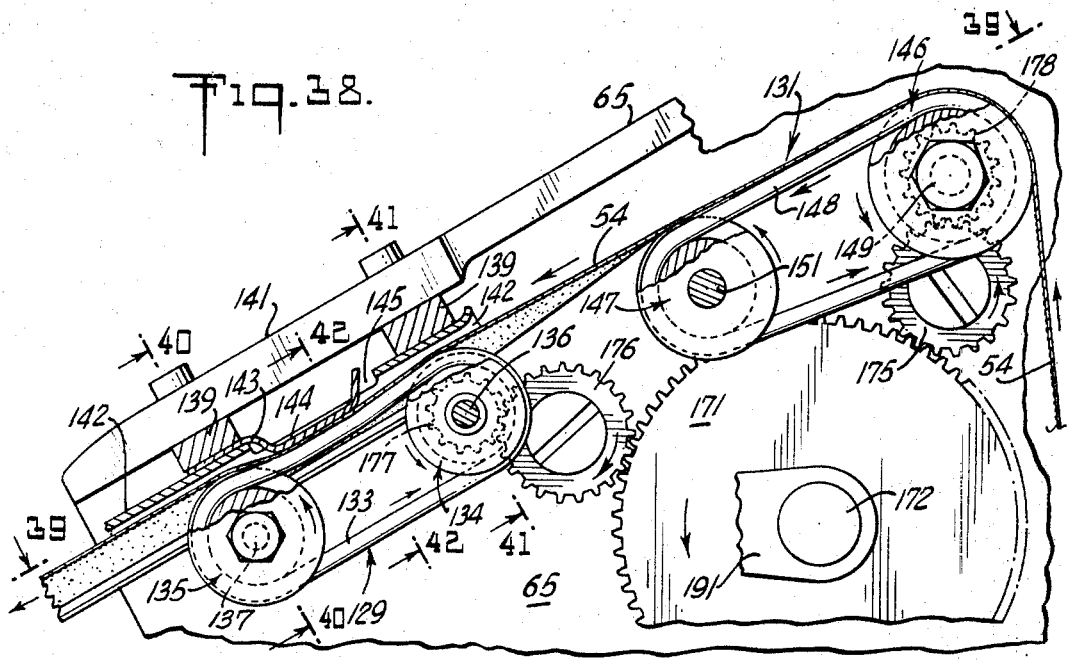
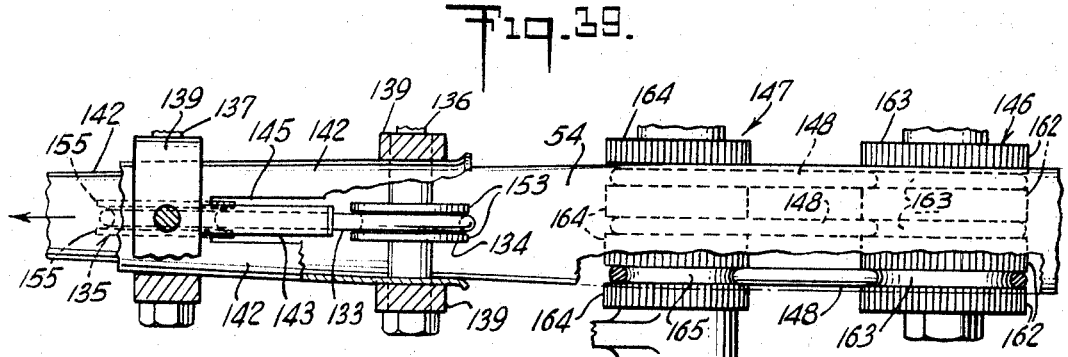
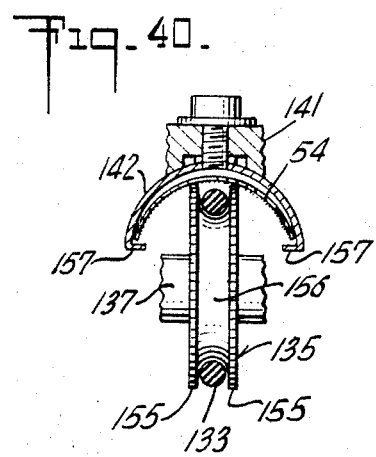
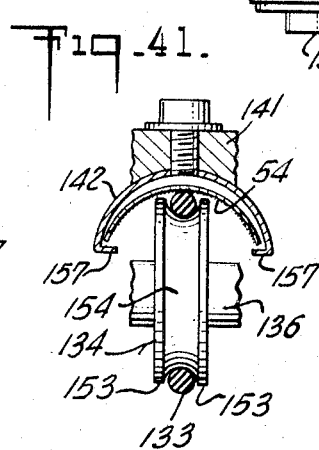
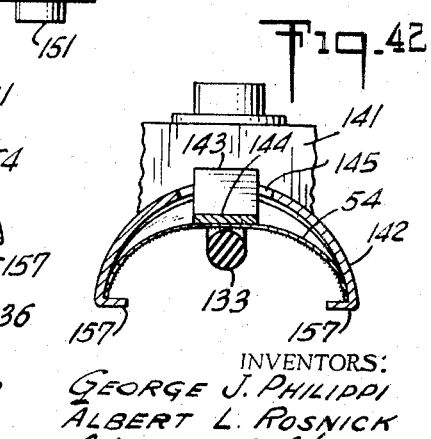
INVENTORS:
GEORGE J. PHILIPPI
ALBERT L. ROSNICK
ATTORNEY.

3,434,907
SPLICING DEVICE AND RESULTING PRODUCT
George J. Philippi, Plainfield, and Albert L. Rosnick, Jamesburg, N.J., assignors to Johnson & Johnson, a corporation of New Jersey
Filed June 2, 1965, Ser. No. 460,646
Int. Cl. B31f 5/06; B26f 1/24
U.S. Cl. 156—505                            21 Claims The present inention relates to splicers for picture film, such as moving picture film, and, more particularly, to such splicers which utilize pressure-sensitive-adhesive tape to form the splice. These splicers are adapted to splice several individual films together for subsequent processing of the film in long lengths. This invention also relates to the spliced film produced by splicers of this type.

In this connection, when the term "picture film" is used hereinafter it shall mean photographic film adapted to receive images on subsequent frames of the film and which includes sprocket holes for driving the film through the camera and through various film processing steps. Similarly, when the term "pressure-sensitive-adhesive tape" is used hereinafter it shall mean tape comprising a nonadhesive backing, or supporting layer, and a normally tacky and pressure-sensitive adhesive layer applied to one side of the backing for adhering the tape to an application surface merely by pressure applied to the backing.

Heretofore, in the processing of picture film the individual lengths of film have been spliced together in a dark room prior to processing by various mechanical devices such as rivets, eyelets, staples, or the like, to form large rolls of continuous film comprising several individual lengths. The spliced lengths are then driven through the various developing and fixing baths and printing steps necessary to process the film.

Many problems have arisen because of these mechanical devices coming loose during processing, or scratching and tearing the film, or catching on the driving mechanism. In addition, there are difficulties in applying these devices properly in the dark, all of which result in damage to and even loss of film, and the expenditure of many additional man hours in the processing operations.

Efforts have been made to develop devices capable of forming reliable film splices in the dark utilizing pressure-sensitive-adhesive tape in order to overcome these difficulties. However, devices so far developed for this purpose have either been too complicated and expensive or unreliable for continuous use. Furthermore, the film processing tape splicers so far proposed have been limited in use to processing apparatus wherein the film is driven through the processing steps by friction devices which do not utilize the sprockets in the film. In other words, in splices formed by these devices, the tape covers over the sprocket holes in the film. Since about 75 to 80 percent of the film processing apparatus in common use includes sprocket drive devices which utilize the sprocket holes in the film for driving the film through the processing steps, these prior art devices, at best, have only limited application in the film processing field.

The present invention provides a picture film splicer which is simple to operate in the dark room, is relatively inexpensive yet completely reliable, and which forms a film splice (utilizing pressure-sensitive-adhesive tape) which contains sprocket openings corresponding with the sprocket openings in the film. These sprocket openings in the splice allow the spliced film to be driven by sprocket drive devices through the various processing steps and, therefore, open up the entire field of film processing to the splicer of this invention.

One of the main problems in attempting to develop a film processing splicer capable of making splices which can be driven by sprocket devices, is that openings must be made in the tape passing over the sprocket holes in the film. If this is done using some kind of conventional perforator which would remove the tape covering the holes, there is a serious problem of controlling and disposing of the hundreds of thousands of small pieces of adhesive tape removed from the holes.

According to this invention, a new picture film splice is provided wherein sprocket openings are made in the splice, without removing pieces of tape therefrom, by cutting flaps in the splice in the area of the sprocket holes. Furthermore, a novel cutting head is provided for this purpose which comprises cutters for forming the flaps by the penetration of their edges through the splice, rather than by a shearing action of the cutters in cooperation with means supporting the splice as in a shearing perforator. This makes it possible for the cutting head to be operated continually without need for the close tolerances and consequent increased costs required for a continually operable shearing perforator capable of cutting through a splice of this type.

The film splicer of this invention comprises left and right film holding fixtures for positioning the film ends in longitudinal alignment with one another, and the fixtures are spaced from one another longitudinally of the film to provide a splicing passage between them. As a result, the film ends to be spliced are located between the fixtures in the splicing passage. Tape feeding means is provided at one side of the film ends in line with the splicing passage for feeding pressure-sensitive-adhesive splicing tape transversely over and beyond the surface of the film ends with the pressure-sensitive side of the tape facing said surfaces. Folding and wiping means for forming the splice with the tape fed over the film surfaces are located on the other side of the film ends, also in line with the splicing passage. This allows the tape feeding means and the folding and wiping means to be operated independently of one another. In addition, the tape feeding means and the folding and wiping means normally are free of the splicing passage so that the resulting splice may be reached or cut by means descending vertically downwardly towards the film ends into the splicing passage.

The feeding means includes a device for feeding the tape in cantilever fashion across the film and into engagement with a folding device on the other side of the film which cooperates with the wiping means to fold the tape around the film for forming the splice. This tape feeding device includes guide means for imparting a three dimensional cross section to the tape to give the tape sufficient rigidity to allow it to be fed in this manner. Preferably, the guide means is a track having a C-shaped cross section and the novel feeding device includes a continuous narrow feeding belt running in the track in the direction the tape is being fed. The nonadhesive side of the tape rides in contact with the track, and its adhesive side contacts the belt preferably along the center line of the tape. Preferably, also the belt is driven by pulleys and the last pulley to contact the belt before the tape leaves the belt presents a flange extending radially beyond the belt for progressively separating the tape from the belt without applying tension to the tape or retarding its forward movement.

The folding and wiping means of the film holding fixtures are mounted for relative movement with respect to one another transversely of the film in such a way that the folding and wiping means folds the tape under and around the film ends and presses it into sealing relation with the exposed surfaces of the film ends to form the splice. Means also is provided for severing the sealed portion of the tape from the tape supply after the tape is folded around the film ends. Preferably, the tape is fed across the film ends into engagement with the folding and wiping means so that the end of the tape moves with the folding and wiping means under the film ends during the aforesaid relative movement with respect to the film holding fixtures.

The splicer of this invention also includes film supporting and trimming plates mounted for relative slidable movement with respect to the film holding fixtures in and out of the splicing passage, in conjunction with the folding and wiping means, to allow the splice to be completed. These plates have an initial position between the fixtures in the splicing passage directly under the film ends so that they support the film ends as the tape is being fed across them. Preferably, a tacking device is associated with the tape feeding means for pressing a portion of the tape into adhesive contact with the edges of the film ends facing the folding and wiping means and, in one form of this invention, the tacking device also presses the tape into adhesive contact with heel portions of the film supporting plates just beyond the said film edges. With the tape tacked to this edge of the film ends, it does not pull away from the film at this edge when the tape is folded around the film. Furthermore, when the tape is tacked to the heels of the supporting plates, it is folded sharply around the film edges as it is stripped from the supporting plates as they move under the film at the beginning of their relative motion with respect to the film holding fixtures.

Another feature of the splicer of this invention is that the ends of the film may be trimmed while they are in position in the film holding fixtures. For this purpose, the film supporting plates are mounted for reciprocal movement with respect to one another in a direction substantially perpendicular to the surfaces of the film ends, and the film holding fixtures also are mounted for reciprocal movement in the same direction with respect to one another. In the initial position of the film supporting plates, the plates engage the fixtures in such a way that when the fixtures are reciprocated with respect to one another, the plates also reciprocate with the fixtures. These plates normally are urged into contact with one another and present cutting edges where they meet for trimming the film ends passing over them when they are reciprocated in this manner along with the film holding fixtures. Preferably, the film supporting plates and the film holding fixtures are pivotally mounted on a substantially common axis in the initial position of the plates, so that the aforesaid perpendicular reciprocating movement is performed by pivoting the fixtures with respect to one another on this axis. However, as indicated above, the supporting plates are adapted to be moved out of the splicing passage between the fixtures when it is desired to form the splice around the film ends.

Other and further advantages of this invention will appear to one skilled in the art from the following description and claims together with the drawings wherein:

FIG. 1 is a somewhat schematic view in perspective of a film splice according to this invention.

FIG. 2 is a view in perspective of a preferred embodiment of a film splicer according to this invention with the film ends shown in position therein for splicing.

FIG. 3 is a side elevational view of the splicer of FIG. 2 with the hinged portion of the housing wall removed to show certain details of the splicer mechanism.

FIG. 4 is a top plan view of the splicer of FIG. 2 with the top portion of the housing wall shown in section for purposes of illustration.

FIG. 5 is a view partly in section and partly in elevation taken approximately along the line 5—5 of FIG. 3, and partly broken away to show certain features of the splicer.

FIG. 6 is a somewhat enlarged top plan view taken from the line 6—6 showing the device for holding the two housing walls together.

FIG. 7 is a view partly in plan and partly in section taken approximately along the line 7—7 of FIG. 3.

FIG. 8 is a view partly in section and partly in elevation taken along the line 8—8 of FIG. 7.

FIG. 9 is a somewhat enlarged elevational view of the front end of the tape feeding guide.

FIG. 10 is a similarly enlarged view partly in section and partly in elevation taken along the line 10—10 of FIG. 9.

FIG. 11 is an enlarged view partly in section and partly in elevation taken along the line 11—11 of FIG. 4, and showing the splicing tape as it is being fed across the film to be spliced.

FIG. 12 is a similarly enlarged view partly in section and partly in elevation of a portion of the mechanism of FIG. 11 and showing the tape after it has been fed across the film and pressed into adhesive contact with one edge of the film and the film supporting plates adjacent thereto.

FIG. 12a is a more greatly enlarged view in section of a portion of FIG. 12 showing the tacking arm pressing the tape into contact with the trailing edges of the film ends and the film supporting plates adjacent thereto.

FIG. 13 is a similarly enlarged view partly in section and partly in elevation and showing the tape after it has been folded around one edge of the film and just before the wiper presses it into full adhesive contact with the film surfaces.

FIG. 14 is a similarly enlarged view partly in section and partly in elevation showing the tape after it has been wiped into full adhesive contact with the film and severed from the tape supply.

FIG. 15 is a more greatly enlarged sectional view showing the relationship between the tape and the film just after wiping has begun.

FIG. 16 is a similar view at the same enlargement after wiping has been completed.

FIG. 17 is an even more greatly enlarged sectional view through a portion of the resulting splice showing the tape folded around the film and in adhesive contact therewith.

FIG. 18 is an enlarged view partly in section and partly in elevation taken along the line 18—18 of FIG. 3, and showing the cutting head in its raised position.

FIG. 19 is a similarly enlarged view partly in section and partly in side elevation showing the cutting head lowered over the splice just prior to forming the sprocket openings in the splice.

FIG. 20 is a partly broken-away top plan view taken from the line 20—20 of FIG. 19.

FIG. 21 is a more greatly enlarged view partly in section and partly in elevation taken along the line 21—21 of FIG. 20.

FIG. 22 is a similarly enlarged view partly in section and partly in elevation taken along the line 22—22 of FIG. 20 and showing, in phantom, the relationship between the cutting and supporting plates during the cutting operation.

FIG. 23 is a somewhat enlarged schematic top plan view of the spliced film of this invention just prior to trimming the tape.

FIG. 24 is a similar top plan view after the tape has been trimmed.

FIG. 25 is a still further enlarged schematic sectional view taken along the line 25—25 of FIG. 23.

FIG. 26 is an even more greatly enlarged schematic single line section taken along the line 26—26 of FIG. 24.

FIG. 27 is an enlarged schematic sectional view taken along the line 27—27 of FIG. 24.

FIG. 28 is a very greatly enlarged top plan view showing the shape of one of the film positioning projections passing through one of the sprocket holes in the film to be spliced.

FIG. 29 is a greatly enlarged end elevational view of one of the cutters for forming a sprocket opening in the splice of this invention taken from the wiper, or front, end of the machine of FIG. 2.

FIG. 30 is an even more greatly enlarged view partly in section and partly in elevation showing the leading end of the cutter of FIG. 29.

FIG. 31 is a similarly enlarged side elevational view of the cutter of FIG. 29 taken from the left side of FIG. 29, looking at the drawings.

FIG. 32 is an even more greatly enlarged schematic view partly in section and partly in elevation, similar to FIG. 30, and showing the leading end of the cutter just before it passes through the film splice to form a sprocket opening in the splice, with parts of the splicer removed for the sake of clarity.

FIG. 33 is a view similar to FIG. 32 showing the end of the cutter after it has passed through the splice to form the sprocket opening and showing the stripping plate in position above the splice and the supporting plate in position below the splice.

FIG. 34 is a schematic top plan view of the sprocket opening formed by the operation illustrated in FIG. 33.

FIG. 35 is a schematic view showing a sprocket wheel driving spliced film according to this invention through the sprocket openings in the splice.

FIG. 36 is a view similar to FIG. 33 showing a cutter according to a somewhat different embodiment of this invention forming a sprocket opening with double flaps.

FIG. 37 is a top plan view similar to FIG. 34 showing the sprocket opening in the splice, formed by the cutter of FIG. 36.

FIG. 38 is an enlarged view partly in section and partly in elevation of the tape feeding device of the embodiment of the preceding figures.

FIG. 39 is a partially broken away top plan view taken from the line 39—39 of FIG. 38.

FIG. 40 is a further enlarged view partly in section and partly in elevation taken along the line 40—40 of FIG. 38, and showing the tape being stripped from the feeding belt.

FIG. 41 is a similarly enlarged view partly in section and partly in elevation taken along the line 41—41 of FIG. 38, and showing the tape as it just comes into contact with the driving belt.

FIG. 42 is an even further enlarged view partly in section and partly in elevation taken along the line 42—42 of FIG. 38.

Referring to FIG. 1 of the drawings, there is shown a splice 50 according to a preferred embodiment of this invention, which comprises a pair of picture film strips 51 arranged in end to end relation to one another with the sprocket holes 53 of one strip located on the same sequential center to center spacing as the sprocket holes 53 of the other strip and in longitudinal alignment with one another. A length of splicing tape 54 is wrapped transversely around the ends of the strips and pressed into firm adhesive contact with the top and bottom surfaces thereof, and sprocket openings 55 corresponding in position to the sprocket holes 53 of the film are formed in the splice by cutting C-shaped flaps 56 in the splice.

Referring to FIGS. 2–33 and 36–40 of the drawings, there is shown a film splicer according to a preferred embodiment of the invention which comprises a U-shaped foundation casting 58 having spaced elongated side walls 59, an end wall 61 connecting corresponding ends of the side walls 59 and a transverse intermediate wall 62 also connecting the side walls. A drawer 63 is provided at one end of the casting 58 for collecting the tape ends trimmed from the splice 50 during the splicing operation. The drawer 63 is adapted to be withdrawn from the casting to remove the tape ends when necessary or desirable.

A cast or molded base plate 64 is bolted to the side walls 59 of the foundation casting over the drawer at one end of the splicer. A fixed housing wall 65 and a pivoted housing wall 66 extend upwardly from the foundation at the other end of the splicer. The fixed housing wall 65 is part of the foundation casting and the pivoted housing wall 66 is hingedly connected to the near side wall 59 of the foundation in such a way that it may be pivoted upwardly into contact with the fixed housing wall to form a housing for the splicer mechanism at that end of the machine (as shown in FIG. 2), or may be pivoted downwardly to provide access to this mechanism. The housing walls 65 and 66 are adapted to butt up against one another at the top of the machine and are held in position by a spring clip 67 bolted to the fixed housing wall which snaps over a detent 68 extending from the hinged housing wall 66, as shown most clearly in FIG. 6.

The operating parts of the splicer are mounted either on the base plate 64 or from the fixed wall 65 of the housing. A pair of spaced standards 69 and 71 are cast or molded integrally with the base plate 64 for this purpose. Left and right film holding fixtures 72 and 73, respectively, are pivotally mounted from these standards for holding the film in position during the splicing operation, and the film holding fixtures are spaced from one another to provide a splicing passage 74 between them. These fixtures 72 and 73 are adapted to hold the film ends 51 and 52 to be spliced in exact position longitudinally and transversely with respect to one another. Each of the fixtures 72 and 73 comprises a film plate, or track, 75 for holding its respective film end 51 in alignment transversely with respect to the film end positioned in the other fixture. The track comprises opposed flanges 76 and 77 which are spaced from one another by a distance equal to the width of the film 51 so that the longitudinal edges of the film will be in contact with the flanges 76 and 77 when the film is in position in the track, as illustrated in FIG. 4 and FIGS. 20–22. Each of the fixtures 72 and 73 also includes a pair of projections 78 for locating the sprocket holes 53 of the film to assure that each of the film ends is positioned in the fixtures with its sprocket holes located on the same sequential center to center spacing. Thus, the projections 78 of one fixture are spaced from those of the other fixture by a distance which will correspond with the spacing between appropriate sprocket holes 53 in the film 51, to assure this. Obviously, the projections 78 are spaced on each fixture transversely of the film 51 in accordance with the transverse spacing between the sprocket holes 53 in the film. As will be explained more fully hereinafter, the film 51 is positioned in the fixtures 72 and 73 merely by overlapping the film ends and pressing the film downwardly in the track until the projections 78 on each fixture protrude through corresponding sprocket holes 53 in the film. A clamping plate 79 is pivotally mounted on each of the fixtures centrally of the rear flange 77 of the track for holding the film 51 in position after it has been placed over the projections 78. The clamp 79 is mounted for pivotal movement on a fixed shaft 81 extending through the flange 77 and presents an ear 82 at its outer end which extends beyond the track 75. A resilient pad 83 is adhesively attached to the underside of the clamping plate 79 for contacting the film 51 between the flanges 76 and 77 of the track. The clamp 79 may be swung upwardly for positioning the film in the track and then downwardly to press the resilient pad 83 against the film 51 and hold it in position by lifting, and then depressing, the ear 82 at the end of the clamp. The clamps 79 are resiliently held in their uppermost positions shown in FIG. 3, and in their horizontal clamping positions shown in FIG. 11; by leaf springs 90 bolted to the bottoms of the fixtures 72 and 73. The springs 90 are normally flat and lying directly under the bottom of the fixtures, as shown in FIG. 11, but are bent downwardly by the lowermost corners of the clamps, as the clamps are swung upwardly, until the springs assume the configuration shown in FIG. 3 and hold the clamps 79 in their upright positions. The fixtures 72 and 73 are bolted to a mounting bracket 84 having a yoke 85 which fits over one of the standards 69 or 71, and the yoke 85, in turn, is pivotally mounted on a fixed shaft 86 extending through the standard through bushings 87 provided for this purpose. The vertical alignment of the fixtures 72 and 73 with respect to one another is set by adjusting corresponding stop screws 88 which are adjustably mounted in bosses 89 integral with the base plate 64 for contacting the underside of the mounting brackets 84, as shown most clearly in FIGS. 3 and 19. The film holding fixtures 72 and 73 are pivotally mounted in this way for trimming the ends of the film, as will be described more fully hereinafter, and to facilitate positioning the film in the fixtures. Under certain conditions, it is easier to locate the film ends initially in the tracks with respect to one another when the fixtures 72 and 73 are pivoted upwardly to the position shown in phantom in FIG. 2.

A splicing carriage is provided for movement transversely of the film positioned in the fixtures 72 and 73 and through the splicing passage 74 between the fixtures. The splicing carriage comprises a splicing casting 91 mounted for slidable movement through the splicing passage 74 on a pair of spaced traveler rods 92 and 93 which, in turn, are secured in parallel alignment with one another in vertical flanges 94 and 95 at one end of the base plate 64 and a raised boss 96 at the other end of the base plate. The carriage structure and its driving mechanism will be described more fully hereinafter.

A pair of supporting arms 98 are mounted centrally of the carriage in alignment with the splicing passage 74, and in contact with one another, on a mounting bolt 99 paassing transversely through spaced sidewalls 101 of the carriage structure. The outer ends of these arms are in the form of film trimming and supporting plates 102 which normally are in position directly underneath the film in the splicing passage 74. In fact, the outside edges of the supporting plates present horizontal flanges 103 which ride in corresponding grooves 104 extending transversely of the film at the inside edges of the film tracks 75 and on each side of the splicing passage 74, as illustrated most clearly in FIG .22. Thus, when the film trimming and supporting plates 102 are in their normal position they are supported vertically in these grooves 104 in the film tracks 75. On movement of the carriage and supporting arms 98 through the splicing passage 74 the film supporting plates 102 are adapted to slide along the grooves 104 in the film tracks and free themselves therefrom, as the supporting plates 102 pass beyond the fixtures 72 and 73. However, to assure that the film supporting plates 102 remain in vertical alignment with the grooves 104 in the film tracks, vertical stop screws 105 extend upwardly from the carriage underneath and in contact with the underside of the film plates 102 for supporting them horizontally, as shown most clearly in FIG. 11.

The film trimming and supporting plates 102 are adapted to perform a quadruple function. They first help support the film ends 51 as they are being positioned in the film holding fixtures 72 and 73 since they are located directly under the ends of the film. Next, the inner edges 106 of these plates are urged into contact with one another and are designed to act as cutting edges for trimming the ends of the film when the supporting plates 102 are pivoted vertically with respect to one another, as illustrated in phantom in FIG. 22. In this way, they trim the film ends 51 by a scissors action, as will be described more fully hereinafter. For this purpose, the film supporting arms 102 are urged into close contact with another, where they are mounted on the supporting bolt 99, by a dished Belleville washer 107 which, in turn, is forced to press against one of the arms 98 by contact with the head 108 of the supporting bolt. The scissors action of the supporting plates 102 is adjusted by tightening a nut 109 at one end of the supporting bolt 99 to create the desired pressure between the supporting arms 98 through the Belleville washer 107. Then, a set screw 111 passing through one of the carriage walls 101 is set in position against the supporting bolt 99 to fix this relationship.

The third function of the supporting plates 102 is performed in conjunction with a catching groove 112 extending vertically downward in the supporting arms 98 adjacent the supporting bolt 99. This function is to fold the splicing tape 54 about the trailing edge of the film ends 51 when the carriage is moved forward through the splicing passage 74. This will be described more fully hereinafter. Lastly, each of the supporting plates 102 includes a series of openings 113 in registration with the sprocket holes 53 of the film ends for receiving cutters 114 which will form the corresponding sprocket openings 55 in the splice 50. During cutting of the splice 50 to form these sprocket openings 55 the supporting blades 102 support the splice and hold it in position as the cutters 114 pass therethrough. Again, this function and operation will be described more fully hereinafter.

A supply of splicing tape 54 in the form of a conventional roll 116 of pressure-sensitive adhesive splicing tape wound upon itself with the adhesive side of the tape facing inwardly is mounted in a cartridge 117 which, in turn, is mounted in a bracket 118 at the end of a cantilever support 119 extending inwardly from the fixed housing wall 65. As shown most clearly in FIG. 8, the tape 54 is wound upon a conventional core 121 to form the roll 116 and the core 121 is rotatably mounted on a triangular boss 122 extending inwardly from one wall of the cartridge 117. The cartridge 117, in turn, completely encloses the tape roll except for a dispensing opening 123 in its peripheral wall through which the tape 54 is adapted to be withdrawn for dispensing. Opposed flanges 124 are provided extending radially outwardly from the axis of the tape roll at opposite sides of the cartridge for mounting the cartridge 117 on the bracket 118. The bracket is in the form of a plate having opposite edges cut and bent back over the plate to form U-shaped slides 125 and 126 for receiving the opposed flanges of the cartridge. The slide 125 at one edge of the bracket extends the entire length of the bracket, although one corner of the bracket at that edge is removed to facilitate access to the tape 54 passing through the dispensing opening 123 of the cartridge. The slide 126 at the opposite edge of the bracket 118 extends along approximately one-half of the edge and terminates where the plate forming the bracket is bent in at approximately a right angle to form a mounting flange 127 which is bolted to the end of the cantilever support 119.

The tape 54 is withdrawn from the cartridge 117 and placed in position over the film ends 51 positioned in the film holding fixtures 72 and 73 by tape feeding means mounted from the fixed wall 65 of the housing. The tape feeding means comprises a tape feeding device 129, a pulling device 131, a tacking arm 132 and a driving mechanism therefor. The tape 54 is drawn from the cartridge 117 by the pulling device 131, fed out in cantilever fashion substantially horizontally over the film ends by the feeding device 129, and then tacked to the film by the tacking arm 132; all of which are operated by the same driving mechanism. As shown in FIGS. 3, 4, 9 and 10, and most clearly in FIGS. 38–42, the feeding device of this invention comprises a feeding member in the form of a continuous feeding belt 133 which passes around a first pulley 134 and a second pulley 135 which are spaced from one another and fixed to first and second shafts 136 and 137 which, in turn are rotatably mounted in bushings 138 extending inwardly from U-shaped mounting brackets 139 bolted to a mounting section 141 of the fixed housing wall 65. The feeding device also includes a C or U-shaped guide track 142 in the form of a curved plate or pipe section with its concave side facing the feeding belt 133. The guide track 142 is welded to the underside of the U-shaped mounting brackets 139 above the first and second pulleys 134 and 135, as shown most clearly in FIGS. 9 and 10. Another element of the feeding device is a spring presser foot 143 fastened at one end to one of the U-shaped mounting brackets 139 and bent downwardly at the other end to form a flat pressing section 144 for urging the tape 54 passing through the device against the feeding belt 133, as shown most clearly in FIG. 38 and as will be described more fully hereinafter. An opening 145 is formed in the guide track 142 between the U-shaped brackets, as shown most clearly in FIGS. 38 and 39, for receiving the pressing section 144 of the spring presser foot 143.

In the feeding device the first pulley 134 presents spaced annular flanges 153 defining an annular groove 154 and the second pulley 135 presents spaced annular stripping flanges 155 defining an annular groove 156 between them for receiving the feeding belt 133, as shown in FIGS. 39–42. The groove 154 in the first pulley is relatively shallow so that the belt 133 protrudes radially beyond the flanges 153 and its outermost surface is otherwise free of the structure of the first pulley 134. The guide track 142 extends rearwardly of the axis of the first pulley 134 so that the tape 54 progressively assumes a curved concave cross section and enters the track 142 before it contacts the belt 133. The feeding belt 133, itself, is circular in cross section and presents a narrow line of contact to the adhesive side of the tape 54 advancing toward the belt. The pressing section 144 of the presser foot 143 is positioned over the belt 133 and the foot is adjusted so as to press the tape 54 riding in the track lightly downward against the curved topside of the belt 133 passing between the first and second pulleys 134 and 135 so that the belt 133 progressively adheres to the adhesive side of the tape. The bottom surface of the pressing section 144 of the foot is substantially flat so that the tape 54, along its longitudinal center line, is pressed substantially flat as it is brought into contact with the curved outer surface of the belt 133, as shown in FIG. 42. The belt 133 preferably is formed of a resilient material such as hard rubber with the result that it distends slightly as the tape 54 is pressed against it. The uppermost portion of the convex outer surface of the feeding belt 133 is thereby lightly adhered to the adhesive side of the tape 54 as the belt passes from the first pulley 134 to the second pulley 135. Thus, there is a "line of contact" between the belt 133 and the tape which extends along the longitudinal center line of the tape. This "line of contact" actually is a very narrow area whose width is determined in part by the resiliency of the belt and its radius of curvature and in part by the nature of the adhesive and the adjustment of the presser foot 143.

During the time the tape is brought into contact with the belt 133 and fed forward thereby as it passes from the first pulley 134 to the second pulley 135, the belt 133 runs in the track 142 and the nontacky side of the tape slides in contact with the curved concave guiding surface of the track 142. To assure that the tape is properly positioned and properly centered with respect to the track and the belt, rails 157 are provided on each side of the track in the form of flanges extending radially inwardly with respect to the curvature of the track. The rails 157 are spaced to accommodate the tape 54 between them after the tape assumes a curved concave cross section in contact with the correspondingly curved guiding surface of the track 142. Thus, the rails 157 center the tape with respect to the track 142.

The groove 156 in the second pulley 135 is considerably deeper than the groove 154 in the first pulley 134 so that the belt 133 is fully recessed radially inwardly of the periphery of the stripping flanges 155 on the second pulley 135 and these flanges 155 protrude radially outwardly beyond the belt 133, as shown most clearly in FIGS. 38–40. As shown in FIGS. 38 and 40, as the belt 133 enters the groove 156 between the flanges 155 on the second pulley, the tape 54 adhered thereto is led radially outwardly of the path of the belt 133 by the peripheral surfaces of the flanges 155, thereby separating the tape 54 from the belt 133. Thus, the tape 54 normally is pushed lightly off the surface of the belt 133 by the flanges 155 on the second pulley. The perimeters of the flanges 155 have a linear speed at least as great as the outer surface of the belt 133, in fact somewhat greater due to their position radially beyond the surface of the belt, with the result that the second pulley 135 will separate the tape 54 from the belt 133 without adhering to or applying tension to the tape 54 and without retarding the forward movement imparted to the tape by the surface of the belt. The tape 54 then will be fed forward beyond the second pulley 135 by the force imparted to the tape by the belt 133. During the time the tape is separated from the belt by the second pulley, the nontacky side of the tape 54 remains in contact with the curved concave inner surface of the guide track 142, and at least one of the side edges of the tape normally contacts one of the rails 157 along the side of the track 142, so that the tape retains its curved concave cross section as it is fed from the second pulley 135 and out through the end of the track 142 and across the film ends. The track 142 extends beyond the second pulley 135 and includes an inner guide fitting 158 spaced from the pulley 135 which cooperates with the track 142 for maintaining the arcuate cross section of the tape. The fitting 158 is welded to the rails 157 and presents a transverse vertical flange 159 which has an arcuate cross section corresponding to that of the track 142 and forms with the track 142 an arcuate slot 161 through which the tape is fed, as shown most clearly in FIG. 9. The purpose of this flange 159 is to prevent the tape from being dislodged from its arcuate position in the front end of the track 142 when the tape is cut during the splicing operation.

The stripping flanges 155 on the second pulley 135 are axially thin and knurled or interrupted circumferentially so as to present relatively small intermittent surface areas for contacting the tape 54 and separating it from the belt 133 while minimizing contact between the adhesive side of the tape and the stripping flanges 155.

The pulling device 131, shown in FIGS. 3, 4, 38 and 39, comprises a first relatively large pulling roll 146, a second similar roll 147 spaced therefrom, and a set of three continuous pulling belts 148 passing around the first and second rolls 146 and 147. The first pulling roll 146 is mounted for rotation on a corresponding fixed shaft 149 extending cantilever fashion from a boss 152 attached to the fixed housing wall 65, and the second pulling roll 147 is mounted for rotation on a stub shaft 151 which also acts as the carriage drive shaft (as will be described more fully hereinafter). The stub shaft 151 also extends cantilever fashion from another boss 152 attached to the fixed housing wall 65. Each of the three stripping belts 148 is a continuous resilient belt similar to the feeding belt 133 and also is circular in cross section. The first pulling roll 146 presents a series of four spaced annular ridges 162 which define between them a set of three annular grooves 163 for receiving the three stripping belts 148. The belts 148 are recessed in the grooves 163 in such a way that the ridges 162 contact the adhesive surface of the tape 54 as the tape passes over the roll 146. The second roll 147 presents a similar series of four spaced ridges 164 defining between them a corresponding set of three grooves 165 for receiving the belts 148 as the belts pass around the roll 147. The adhesive tape 54 is led around a pulling portion of the first pulling roll 146 and then into contact with the belts 148 as the tape passes between the first and second pulling rolls 146 and 147. The ridges 164 on the second pull roll 147 protrude slightly beyond the belts 148 so that the adhesive surface of the tape 54 is in contact with these ridges as the tape leaves the pulling device 131. The circumferential surfaces of the ridges 162 and 164 are transversely serrated, or knurled, to provide the desired pulling surfaces, as shown in FIGS. 4 and 38. The tape 54 then is withdrawn from the pulling device 131 by the slight tension applied to it by the feeding belt 133.

The tape feeding means is operated automatically by pulling down the outer end of a tape feeding arm 167 toward the film ends 51. A tape feeding handle 168 is provided for this purpose and the arm 167 is adapted to pivot downwardly in a fixed stroke controlled by a cam slot 169 provided in the plate like inner end of the tape feeding arm 167, and a main drive gear 171 for the feeding means is connected to the inner end of the arm 167, as shown most clearly in FIGS. 3, 4, and 5. The tape feeding arm 167 is mounted externally of the fixed housing wall 65 on a shaft 172 which extends through the wall 65 to one side of a one way clutch, not shown, located within a hollow boss 173 attached to the inside of the wall. The main drive gear 171 is connected to the other side of the clutch in such a way that when the arm 167 is depressed the drive gear 171 rotates counterclockwise, but when the arm 167 is elevated to its upright position the drive gear does not turn. A stop pin 174 extends outwardly from the fixed housing wall 65 into the arcuate cam slot 169 in the tape feeding arm for controlling the extreme positions of the arm. As shown most clearly in FIGS. 3, 4, 11 and 38, the teeth of the main driving gear 171 engage spaced intermediate gears 175 and 176 which, in turn, are rotatably mounted from the fixed housing wall. The intermediate gear 176 drives the feeding device through a spur gear 177 fixed to the shaft 151 of the first pulley 147; and the intermediate gear 175 drives the pulling device through a spur gear 178 fixed to the shaft 149 of the first pulling roll 146 thereof. The driving relationship between the pulling device 131 and the feeding device 129 is adjusted so that the pulling device 131 applies the necessary tension to unroll the splicing tape 54 from the roll supply 116 and present it to the feeding device 129; and the feeding device 129 feeds the tape 54 forward over the film ends while applying only enough tension to the tape to remove the slack between the feeding device and the pulling device and prevent the tape from wrapping around the smaller pulling roll 147. Of course, this may be accomplished, in the apparatus shown, by operating the feeding belt 133 at the same peripheral speed as the pulling rolls 147.

As explained hereinbefore, the feeding device 129 imparts a C or U-shaped bidirectional transverse cross section to the tape surfaces for increasing the rigidity of the tape 54 so that it may be fed out over the film ends 51 by projecting it cantilever fashion out beyond the end of the guide track 142. The tape end is fed in this manner over and across the film ends and into the catching groove 112 in the supporting arms 98, as shown most clearly in full and in phantom in FIG. 11.

As the tape feeding arm 167 is drawn towards the end of its stroke, and after the tape end reaches the position referred to in the catching groove 112, the tacking arm 132 is caused to pivot downwardly and press the adhesive side of the tape 54 into contact with the trailing edge of the film ends 51 and the trailing ends, or the heels 181, of the adjacent film supporting plates 102, as shown most clearly in FIGS. 12 and 12a. The tacking arm 132 comprises a resilient pressure pad 182 of foam rubber or some similar resilient material suitably coated on its underside to provide wear-resistance and the necessary release properties for continual contact with and separation from the tape in the tacking operation. The pressure pad 182 is secured by an adhesive or other means to the underside of the outer end of a spring arm 183 which, in turn, is bent at its inner end and bolted to the cross bar 184 of a U-shaped tacking bracket having opposed legs 185 which extend downwardly over the sides of the outer end of the guide track 142. The lower ends of these legs 185 are pivotally mounted on lugs 186 depending from the guide track 142. One of these legs 185 is fixed to a short pivot arm 187 which, in turn, is pivotally connected at its opposite end to a drive rod 188 connected through an elongated link 189 to a driving arm 191 extending from the drive shaft 172 and adapted to rotate with the main drive gear 171. An actuating collar 192 is fixed in position on the drive rod 188 for cooperating with spaced actuating bars 193 and 194 extending inwardly from the link 189, and the link is pivotally attached at one end to the driving arm 191. The actuating bars 193 and 194 ride on the drive rod 188 through holes provided for this purpose. FIG. 11 illustrates the relative positions of the tacking arm 132, the actuating collar 192 and the bars 193 and 194 just as the bar 193 comes into contact with the collar 192 so that further counterclockwise rotation of the driving arm 191 will cause the tacking arm 132 to pivot downwardly and press the tape 54 into contact with the film and the supporting plates, as illustrated in FIGS. 11, 12 and 12a. Once the tacking arm 132 is brought down into contact with the film it will remain in this position until it is lifted to its upright position by the linkage just described. In fact, the tacking arm 132 will remain in any position in which it is placed, unless moved therefrom, by virtue of a coiled spring positioner 195 pressing against one leg 185 of the arm, as shown in FIG. 2. The tacking arm will be pivoted to its upright position when the lower activating bar 194 reaches the position shown in phantom in FIG. 12 and clockwise movement of the driving arm 191 continues until the tape feeding arm reaches its upright position. Thus, it will be seen that the tape 54 is fed automatically from the tape roll 116 into position over the film ends 51 and is adhered thereto by the tacking arm preparatory to completing the splice, merely by pulling the tape feeding arm 167 downwardly to the bottom of its stroke and then returning it to its upright position.

As mentioned hereinabove, the splicing carriage comprises a splicing casting 91 mounted for slidable movement through the splicing passage 74 between the film holding fixtures 72 and 73 on spaced traveler rods 92 and 93 mounted from the base plate 64. Referring in particular to FIGS. 3, 5 and 7, one traveler rod 92 is round in cross section and the rod 93 is square in cross section and somewhat shorter than the round rod. Both rods are supported at one end in the raised boss 96 extending upwardly from the base plate at one end of the machine. The round traveler rod 92 is supported at the other end in a vertical flange 94 extending upwardly from a relatively elongated extension 201 of the base plate. The square traveler rod 93 is supported at its other end in a similar vertical flange 95 extending upwardly from the base plate 64. The rods are arranged in parallel alignment with one another with the round rod 92 fitting into a circular hole in the boss and the square rod 93 sliding into a vertical slot 202 in the top of the boss, as shown most clearly in FIG. 18. Thus, the rods 92 and 93 are fixed in position laterally with respect to the base plate 64 and the square rod is adjustable to some extent vertically to accommodate the dimensions of the splicing casting. Referring, in particular, to FIGS. 11, 13, 14 and 18, the splicing casting 91 comprises a pair of longitudinal carriage walls 101 connected by front and rear transverse supporting sections 203 and 204, respectively. Each of the supporting sections 203 and 204 has a round slide opening 205 and a horizontally slotted side opening 206 for receiving the round and square traveler rods, respectively, for slidably mounting the carriage on the rods, as shown most clearly in FIG. 18. The sidewalls 101 of the carriage extend upwardly at one side of the film holding fixtures 72 and 73 for receiving the mounting bolt 99 for the supporting arms 98. The trailing end of the carriage casting 91 is in the form of a raised platform 207 to which is bolted a wiper 208 for pressing the tape down on the film ends and completing the splice, and a cutting knife 209 for separating the completed splice from the tape end attached to the tape supply. The leading end of the carriage casting is in the form of a longitudinal arm 211 which is pivotally connected to a double lever linkage for moving the carriage through the splicing passage 74. The carriage normally is urged to the position shown in FIG. 11 by a compression spring 212 fitted over the round rod 92 and extending between the supporting section 203 and the vertical flange 94. The rearward position of the carriage (shown in FIG. 11) is determined by a stop 213 adjustably mounted in the raised boss 96. The carriage is stopped at the other end of its stroke by an adjustable stop screw 214 extending through a C-shaped bracket 215 bolted to the vertical flange 95. This stop 214 contacts the supporting section 203 of the carriage casting when the carriage reaches the forward end of its stroke.

The various parts of the carriage perform three main functions as it is moved from one end of its stroke to the other through the splicing passage passage 74. First, the catching groove 112, acting alone or in conjunction with the supporting plates 102, folds the tape 54 around each of the film ends 51. Then, the wiper 208 completes the fold and presses the adhesive side of the tape into firm contact with the exposed surfaces of the film ends to form the splice 50. Lastly, the horizontal knife 209 separates the splice 50 from the tape supply. This movement of the carriage through the splicing passage 74 is effected by pivoting a carriage feeding lever 216 downwardly toward the film ends. The outer end of the carriage lever 216 terminates in a handle 217 which may be grasped easily for pivoting the lever 216 and imparting movement to the carriage. As shown most clearly in FIGS. 3, 5 and 11, the carriage feeding lever 216 is mounted on the stub shaft 151 extending inwardly from the fixed housing wall 65. Also mounted on the stub shaft 151 and keyed to the carriage lever 216 for rotative movement therein about said shaft, is a Z-shaped link 219. The other end of the Z-shaped link 219 is pivotally connected to a pin 221 at the leading end of the carriage, as described hereinbefore, through an intermediate link 222 which also is pivotally connected to the Z-shaped link 219, as illustrated most clearly in FIG. 11. An adjustable cam type stop 199 extends outwardly from a raised ear 200 at the end of the elongated arm 201 for limiting the upward swinging movement of the intermediate link 222. Counterclockwise pivotal motion of the carriage feeding lever 216 toward the film ends 51 causes the aforesaid links 219 and 222 to swing down into the position shown in phantom in FIG. 11 to draw the carriage toward the leading end of the base plate 64. This motion continues until the supporting section 203 of the carriage contacts the stop screw 214 at this end of the base plate, as shown in FIG. 14.

The mechanism for the folding of the tape 54 about the film ends 51 and the wiping down thereof by the carriage during the aforesaid motion will now be described more fully by referring to FIGS. 11–17. The feeding of the tape 54 across the film ends 51 and into the catching groove 112 and the tacking down thereof already has been described. Just before the carriage begins its stroke, the tape is in the position shown in FIGS. 12 and 12a, having been tacked into adhesive contact with the trailing edges of the film ends 51. As mentioned hereinbefore, the tacking arm 132 may be adjusted so that it also will take the tape 54 into adhesive contact with the heel 181 of the film supporting plates 102 beyond the trailing edges of the film, as shown in FIG. 12a. At this point, the leading end of the tape 54 remains inserted in the catching groove 112, as shown in FIG. 12.

The wiper 208, itself, comprises an L-shaped support bolted to the raised rear portion 207 of the carriage. This support consists of a horizontal leg 225 extending toward the film ends and a vertical flange 226 extending upwardly at its rear end. A spring wiper arm 227 and a horizontal cutter bar 224 are bolted to the top of the flange 226. The front end of the spring arm 227 is in alignment with the horizontal leg 225 of the support and the spring arm 227 and the horizontal leg 225 respectively present wiping pads 228 and 229 for pressing the tape 54 into contact with the film ends. The spring arm 227 is of a resilient material such as spring steel and the pad 229 of the arm normally is urged into contact with the pad 228 of the support since the normal position of the spring arm forces this relationship, as shown in FIG. 11. The wiping pads preferably are formed of a resilient material such as silicone rubber, and may be secured to the horizontal leg 225 of the support and the spring arm 227, respectively, by an adhesive or by a mechanical connection such as shown in FIG. 15 for the pad 229 on the arm 227. The wiping pad 229 on the spring arm is shaped to present a transverse line of contact with the tape to concentrate the wiping pressure during the wiping stroke of the carriage. The cutter bar 224 supports the blade 209 which also is bolted to the flange 226 and extends beyond the bar 224 and beyond the wiper 208 for severing the tape between the splice 50 and the feeding device 129. As shown in FIG. 4, the cutting edge of the blade 209 is serrated to facilitate penetration of the tape during the cutting stroke of the carriage. The operation of the carriage for wiping and cutting purposes will be described more fully hereinafter.

A cutting head 231 for forming the sprocket openings 55 in the splice 50 is pivotally mounted between the standards 69 and 71 extending upwardly from the base plate 64. This cutting head 231 comprises a supporting yoke 232 connected to short stub shafts 230 pivotally mounted in the standards 69 and 71. The yoke 232 straddles the wiper 208 and cutting knife 209 and other parts of the carriage and has an upright position, shown in FIGS. 2–4 and 18, where it stays during the tape feeding and splicing operations; and a horizontal operating position in contact with the splice 50, shown in FIG. 19, for cutting the sprocket openings 55 in the splice. Referring particularly to FIGS. 2–4 and 18 and 19, the cutters 114 are mounted in two parallel rows of six cutters per row in which they are spaced from one another on centers corresponding with the sprocket holes 53 in the film, for cutting the sprocket openings 55 in the tape of the splice on the same sequential center to center spacing as the sprocket holes 53 in the film ends 51. The cutters 114 are in the form of elongated rectangular cutting bars which will be described more fully in connection with FIGS. 29–34, 36 and 37 which are intended to show the operation of the cutters and the way in which they form the C and H-shaped flaps in a splice according to this invention.

The cutter bars 114 are held in corresponding openings in a cutter mount 233 which, in turn, is mounted for slidable movement perpendicular to the plane of the yoke 232 on a pair of pins 234 fixed at right angles to the yoke near the outer end thereof. Compression springs 235 are placed on the pins 234 between the yoke 232 and the cutter mount 233 so as to normally urge the cutter mount 234 away from the yoke 232 to the position shown in FIGS. 2–4. The cutting head 231 also includes a trimming knife 236 at its outer end for trimming the tape from the leading edge of the splice 50 after the wiping operation. The trimming knife 236 is bolted to the front edge of the cutter mount 233 in such a way that it also extends at right angles to the yoke 232 of the cutting head. A positioning plate 237 is attached to the yoke 232 on the opposite side of the yoke from the cutter mount 233 but in line therewith. This plate 237 has two rows of openings 238 aligned with the cutter bars 114 so that the cutter bars pass therethrough when the cutter mount 233 is pushed along the mounting pins 234 against the resistance of the compression springs. The trimming knife 236 has a tongue 239 extending from one of its edges which normally is urged into contact with an adjacent edge of the positioning plate 237 by the resiliency of the trimming knife itself. This edge of the positioning plate 237 is aligned with the leading edge of the film 51 (which, in turn, is held in position by the flanges 76 and 77 of the film track) with the result that the cutting edge of trimming knife 236 will strike the tape just beyond the edge of the film when the cutting head 231 is lowered to the position shown in FIG. 19 and operated to depress the trimming knife 236.

An actuating lever 241 for operating the cutting head 231 is pivotally mounted between a pair of opposed ears 242 extending perpendicularly from the legs of the yoke 232. This actuating lever 241 has a handle 243 at its outer end and a pressing foot 244 extending toward the cutter mount 233. The pressing foot 244 is adapted to contact an anvil 245 bolted to the cutter mount 233 for operating the cutting head. The actuating lever 241 is prevented from swinging downwardly past the horizontal, when the cutting head is in the position shown in FIGS. 2-5, by the shape of its inner end 246. As shown most clearly in FIGS. 3 and 11, the inner end 246 of the actuating lever 241 is inclined so that its lowermost edge 247 comes into contact with a shoulder 248 on the adjacent yoke structure and prevents the lever 241 from pivoting further downwardly. To operate the cutting head 231, the handle 243 of the actuating lever 241 is lifted upwardly until the pressing foot 244 contacts the anvil 245 and then is moved further in the same direction to cause the handle 241, the yoke 232 and the entire cutting head structure to pivot downwardly over the film ends 51 to the position shown in FIG. 19, where the positioning plate 237 of the cutting head comes into contact with the splice 50. The positioning plate 237 of the cutting head and the supporting plates 102 of the carriage then grip the splice 50 between them as the actuating lever 241 is pivoted further downwardly to depress the cutter mount 233 against the resistance of the compression springs 235 and cause the cutter bars 114 to pass through the openings 238 in the positioning plate 237 and penetrate the splice 50 to cut out the sprocket openings 55 in the splice, as will be described more fully hereinafter in connection with the operation of the splicer.

In operation, the film ends 51 are positioned in the film holding fixtures 72 and 73, as described hereinbefore, by lifting up the clamping plates 79 of the fixtures and placing the film ends 51 between the flanges 76 and 77 of the tracks with their ends overlapping each other and the inner cutting edges 106 of the film supporting plates 102 slightly. The film ends 51 are fixed in this position by pressing the film down so that the pair of projections 78 in each of the tracks penetrate corresponding sprocket holes 53 of each of the film ends. Then, the clamping plates 79 are pressed downwardly so that the pads 83 hold the film in this position in the tracks. As explained hereinbefore, it is convenient to adjust each of the film holding fixtures 72 and 73 upwards slightly, as shown in phantom in FIG. 2, while locating the film therein. This allows the operator to feel the amount by which the film end overlaps the cutting edges 106 of the supporting plates 102 and assure that the overlap is not too great. After both film ends 51 are positioned in their respective fixtures 72 and 73, the fixtures are reciprocated with respect to one another as shown in FIG. 22, to cause the inner cutting edges 106 of the film supporting plates to shear off the overlapping portions of the film and provide a straight edge at the end of each film end 51 which allows the film ends to lie over the supporting plates in abutting relationship with one another, as shown in FIGS. 20 and 22.

The film is now ready for the tape 54 to be fed in position across the film ends 51 and tacked into adhesive contact therewith, as described hereinbefore. This is done very simply, merely by grasping the handle 168 of the tape feeding lever 167 and drawing it toward the film 51 until it reaches the end of its stroke. This not only positions the tape 54 over the film ends 51 with the end of the tape in the catching groove 112, but also tacks the adhesive underside of the tape into adhering contact with the trailing edges of the film ends 51. If desired, the tacking arm 132 may be adjusted so that the tape 54 also is adhered to the heels 181 of the supporting plates 102 just beyond the trailing edges of the film ends, as shown in FIG. 12a. This is advantageous in folding the tape 54 tightly around the trailing edges of the film 51 during the folding operation, as will be described more fully hereinafter. The tape feeding lever 167 then is returned to its initial position, as described hereinbefore.

Next the tape 54 now folded about the film ends 51, severed from the tape supply, and wiped down into firm adhesive contact with the exposed surfaces of the film by moving the splicing carriage from its initial position, shown in FIGS. 11 and 12, to that shown in FIG. 14. This entire operation is accomplished merely by grasping the handle 217 of the carriage lever and drawing it downwardly toward the film 51 until it reaches the end of its stroke and completes the splice. The handle 217 then is released to allow the compression spring 212 to return the carriage to its initial position. When the tape 54 is tacked into adhesive contact with the heel 181 of the supporting plates 102, as shown in FIG. 12a, it is stripped from the supporting plates 102 as the supporting plates begin to move, or slide, along underneath the tape ends 51. This results in pulling the tape 54 tightly around the trailing edges of the film so that a tight fold is begun before the tape is completely released from the supporting plates 102. However, whether or not the supporting plates 102 begin folding the tape around the film in this manner, the tape 54 is folded around the film ends 51 by virtue of the fact that the end of the tape is retained in the catching groove 112 in the supporting arms 98 and carried along with the catching groove 112 as it passes under the film ends 51, as shown in FIG. 13. FIG. 13 illustrates the position of the carriage after the tape 54 has been folded around the leading edges of the film ends 51 and just before the wiping pads 228 and 229 begin pressing the tape tightly into adhesive contact with the exposed film surfaces. This figure also shows that the tape 54 has not yet been cut from the tape supply by the serrated cutter blade 209. As the carriage continues its stroke the wiper 208 begins to wipe the tape into the aforesaid adhesive contact with the film surfaces, and just after the leading edge of the splice 50 being formed passes the center of the wiping pads 228 and 229 and cutter blade 209 operates to sever the tape from its supply. At about the same time, the former leading end of the tape 54 springs free of the catching groove 112 so that the film 51 and the tape 54, folded around it, assumes roughly the configuration shown in FIG. 15 as the wiping stroke continues. FIG. 14 illustrates the end of the wiping stroke of the carriage; and FIG. 16 is an enlargement of the wiping pads 228 and 229 and the splice 50 of FIG. 14, showing that the whole splice has passed the center line of the splicing pads, and with the pads 228 and 229 resting on the untrimmed ends 251 of the tape forming the splice. FIGS. 15, 16 and 17 illustrate that wiping pressure is applied to the tape 54 folded around the film ends 51 along a line of pressure determined by the somewhat peaked shape of the top wiping pad 229 and that this line of pressure is applied from the initial fold all the way across the film 51 to the other side of the splice 50 to assure that all air is squeezed out from between the tape and the film and that the adhesive side of the tape is pressed into firm adhering contact with the exposed film surfaces, as shown schematically in FIG. 17.

The splice 50 now is ready for the trimming and cutting step. The tape 54 now is applied across the film 51 in such a way as to cover the sprocket holes 53 in the film underneath the tape and overlap the film at the trailing edges of the film ends. It then is necessary to cut sprocket openings 55 in the tape 54, forming the splice 50, on centers corresponding with those of the sprocket holes 53 in the film, and that the overlapping tape ends 251 be trimmed from the edge of the splice, in order to allow the spliced film to be driven by sprocket wheels through subsequent processing steps. This is done, as previously described, by swinging the actuating lever 241 of the cutting head 231 forwardly and downwardly to press the cutting head down into contact with the top of the spice, as shown in FIG. 19. As explaned hereinbefore, the splice now is held tightly between the supporting plates 102 of the carriage and the positioning plate 237 of the cutting head, and the respective holes 113 and 238 in the supporting plates 102 and the positioning plate 237 of the cutting head are aligned vertically with one another to receive the cutter bars 114 as the cutter mount 233 is pressed further downwardly in its cutting stroke, as best illustrated in FIGS. 19 and 33. The trimming knife 236 is cammed by the tongue 239 slidably over the positioning plate 237 in such a way as to strike the tape 54 just beyond the leading edges of the film ends 51 and trim the overlapped tape ends 251 from the splice 50 as the cutting head descends.

FIGS. 29–34 illustrate the shape of the cutter bars 114 of the embodiment of this invention shown in the preceding figures. FIGS. 36 and 37 illustrate a somewhat modified cutter bar 252 of this invention. As shown in FIG. 29, the top end 253 of the bar 114 is round and recessed at its upper extremity for holding the bar in the hole provided therefor in the cutter mount 233. The cutting end of each cutter bar 114 is inclined and in the form of an inverted transverse V, so that each cutter presents a pair of spaced inclined longitudinal cutting edges 254 and a V-shaped transverse cutting edge 255 connecting the corresponding (lowermost) ends 256 of the longitudinal cutting edges 254. FIG. 32 illustrates the fact that the inclined longitudinal cutting edges 254 are longer, with respect to the horizontal, than the original sprocket holes 53 in the film 51 to assure that the new sprocket openings 55 in the splice 50 are at least as large as the sprocket holes 53, and to assure that the resulting openings 55 are sufficiently extensive with respect to the centers of the original sprocket holes 53 to enable the openings 55 to receive sprocket teeth for driving the film. FIG. 33 is intended to illustrate schematically the lowermost position of the cutter bars 114 with respect to the splice 50, the supporting plates 102 and the positioning plate 237. It will be seen that the apex 257 of the V-shaped transverse cutting edge 255 has passed all the way through the splice 50, at this point, to assure that a full flap 56 is cut from the splice to form the desired sprocket opening 55. Since the cutter 114 does not penetrate the splice appreciably further than shown in FIG. 33, there is no effective connection between the longitudinal cutting edges 254 of the cutter bar at the opposite side of the bar. Thus, the inclined longitudinal cutting edges 254 are connected by another cutting edge only at one end of the cutter 114. This assures that the cutters 114 make C-shaped cuts in the splice 50 when they pass therethrough. Such a cut is illustrated in FIGS. 33 and 34. Since the upper ends 258 of the inclined longitudinal cutting edges 254 of the cutter 114 pass through the splice and the lower end of the V-shaped rear side of the cutter also penetrates the splice to some extent, there are very short transverse cuts 259 in the splice along the fold line A—A where the flap 56 is connected to the flat portion of the splice. Since the tape 54 is bent at the fold to form the flap 56 at this end of the newly formed sprocket opening 55 the mechanical engagement between the tape 54 and the film 51 is increased to supplement the adhesive contact therebetween. These fold lines A—A extend transversely of the film 51 in such a way that the flaps 56 are adapted to be folded in a transverse direction either upwardly or downwardly with respect to the film 51 to accommodate the particular sprocket wheel with which they are brought into contact. FIG. 35 schematically illustrates a spliced film 261, according to this invention, being driven by a sprocket wheel 262. The spliced portion of the film, which has C-shaped flaps 56 according to the foregoing embodiment, is shown passing over the wheel 262 with the teeth, or sprockets, 263 of the wheel entering the sprocket openings 55 of the film.

In the embodiment of FIGS. 36 and 37 the cutter 252 edge, in effect has a double apex and operates as if it consisted of two cutters according to the embodiment of the preceding figures, placed back to back. This results in forming an H-shaped cut 265, or two C-shaped cuts back to back, as illustrated. The cutters 252 of this embodiment work substantially in the same fashion as the cutters of the preceding embodiment with the exception that it is not necessary for them to have as long a stroke because they cut from both ends of the sprocket opening 265 to form H-shaped cuts and a corresponding pair of opposed C-shaped flaps 266 at each sprocket opening.

Even though in the foregoing embodiments of the invention the film is pictured as having a double row of sprocket holes, one alongside each of its edges, it will be apparent to one skilled in the art that the apparatus and splice of this invention can be adapted for film having only a single row of sprocket holes. Similarly, while resilient wiping pads are shown for pressing the tape into firm adhesive contact with the film surfaces at the splice, other devices such as rollers may be used for this purpose. It will be readily apparent to those skilled in the art that innumerable other variations, applications, modifications and extensions of the basic principles involved may be made without departing from the spirit or scope of this invention.

The invention claimed is:

1. A film splicer comprising left and right film holding fixtures for positioning the film ends to be spliced in end to end relation and in longitudinal alignment with one another; said fixture being spaced from one another longitudinally of the film to provide a splicing passage between them; a splicing carriage aligned with said passage transversely of the film and said fixtures being mounted for relative movement with respect to one another transversely of the film; said carriage having tape folding and wiping means associated therewith for said relative movement and said folding and wiping means having an initial position at one side of the film ends; tape feeding means aligned with said passage at the other side of the film ends and said tape feeding means being adapted to feed pressure sensitive splicing tape from a tape supply transversely over and beyond the surfaces of said film ends with the pressure sensitive side of the tape facing said surfaces; said folding and wiping means being adapted to fold the tape under and around the film ends and press the folded tape into sealing relation with the exposed surfaces of the film ends to form a splice, on relative motion of said carriage with respect to said fixtures; and means for severing the sealed portion of said tape from the tape supply.

2. A film splicer according to claim 1, wherein the tape is fed by the tape feeding means into engagement with the folding and wiping means.

3. A film splicer according to claim 2, wherein said folding and wiping means includes a catching device for engaging the end of the tape fed over the film surfaces.

4. A film splicer according to claim 1, which further comprises film supporting means associated with the carriage for the said relative movement with respect to said fixtures, said supporting means having an initial position between said fixtures directly under the film ends in said passage.

5. A film splicer according to claim 4, which further comprises a tacking device associated with the tape feeding means for pressing a portion of the tape into adhesive contact with the top surface of the film ends along the film edge facing said folding and wiping means, and actuating means for operating said tacking device as aforesaid after the tape is fed over said film ends but before the said relative movement of said carriage with respect to said film ends.

6. A film splicer according to claim 5, wherein the film supporting means presents a heel portion underneath said film edge and the tacking device also presses the tape into adhesive contact with said heel portion adjacent said edge, whereby the tape is folded tightly around said film edge as it is stripped from said heel when the heel is moved under the film ends during the said relative movement of the carriage with respect to said fixtures.

7. A film splicer according to claim 5, wherein said tacking device comprises an arm presenting a pressure pad adapted to be pressed into resilient contact with the tape passing over said film edge.

8. A film splicer according to claim 4, wherein the film strips each have a row of sprocket holes spaced inwardly of one of their longitudinal edges and said film supporting means is returned to a position directly under the splice upon return movement of said carriage after formation of the splice by the folding and wiping means; and which further comprises a cutting head movable downwardly into contact with the top surface of the splice after the film supporting means is returned to its position under said splice, said cutting head presenting a row of cutters adapted to cut sprocket openings in said splice corresponding to the sprocket holes in the film ends, and said film supporting means presenting openings adapted to receive said cutters when the cutters have passed through the splice to form said sprocket openings.

9. A film splicer according to claim 8, wherein said cutting head includes a pressing device which is adapted to press down upon the top surface of said splice and thereby cooperate with said film supporting means so that the pressing device and the film supporting means hold the splice between them, said pressing device also presenting a row of openings adapted to receive said cutters, whereby the cutters first pass through the holes in the pressing device, then cut into the splice, and finally pass through the splice and enter the holes in the film supporting means to complete the cutting operation and form the sprocket openings.

10. A film splicer according to claim 9, wherin the cutters are held in a cutter mount and the cutter mount normally is urged away from the pressing means by resilient means, and said cutter mount is adapted to be driven towards said pressing device against the resistance of said resilient means to advance the cutters through the pressing device to form the sprocket openings in the splice.

11. A film splicer according to claim 8, wherein the cutting device is mounted on a frame which is pivotally mounted on the splicer at the same side of the film holding fixtures as the initial position of the folding and wiping means, and wherein the cutters are maintained in registration with the sprocket holes in the film ends positioned in the film holding fixtures by the location of the cutters respect to said frame and the relationship between the pivotal mounting of the frame and the film holding fixtures.

12. In a device for forming a picture film splice comprising a pair of picture film strips each having a row of sprocket holes spaced inwardly of one of its longitudinal edges and extending parallel to said edges, said strips being arranged in end to end relation to one another with the sprocket holes of one strip located on the same sequential center to center spacing as the sprocket holes of the other strip and in longitudinal alignment with one another, and a piece of pressure sensitive adhesive splicing tape applied over said strip ends and the sprocket holes thereof in sealing relation with the exposed surfaces of both strips to form a splice joining said ends; means for holding the spliced film strips in a definite position with respect to one another; a cutting head for forming sprocket openings in said splice which comprises a set of cutters above the splice registered with the sprocket holes in the film ends thereof and mounted for movement of the cutters through said splice; and a supporting plate underneath the splice having openings for receiving said cutters after they pass through said splice; each of said cutters presenting a pair of spaced longitudinal cutting edges and only one transverse cutting edge connecting the longitudinal cutting edges; whereby the cutters make C-shaped flaps in said splice when they pass therethrough.

13. A device according to claim 12, wherein each cutter is substantially rectangular in transverse cross section and the longitudinal cutting edges are parallel with one another and inclined downwardly towards one side of the splicer, said longitudinal cutting edges being connected by an inverted V-shaped groove which is inclined in the same direction as the longitudinal edges, said transverse cutting edge extending between the lowermost ends of the longitudinal cutting edges and having an inverted V-shape, and which further comprises means for controlling the stroke of said cutters so that their downward motion terminates just after the uppermost ends of the longitudinal cutting edges pass through said splice, thereby assuring that the splice is not cut appreciably by the inverted V-shaped portions of the cutters connecting the upper ends of said longitudinal edges.

14. A device according to claim 12, wherein the transverse dimensions of the openings in the supporting plate are greater than the corresponding transverse dimensions of said cutters, and said cutting edges are spaced from the edges of said openings, whereby the splice is cut by the penetration of said edges through the splice rather than by a shearing action between the cutters and the edges of the openings in the supporting plate.

15. A film splicer comprising left and right film holding fixtures for positioning the film ends to be spliced in end to end relation and in longitudinal alignment with one another; said fixtures being spaced from one another longitudinally of the film to provide a splicing passage between them; film supporting and trimming plates having an initial position between said fixtures in said passage directly under the film ends, said plates being mounted for reciprocating movement with respect to one another in a direction substantially perpendicular to the surfaces of the film ends and for relative slidable movement with respect to said fixtures in and out of said splicing passage; said fixtures also being mounted for reciprocating movement with respect to one another in a direction substantially perpendicular to the surfaces of the film ends; said plates engaging said fixtures in the initial position of said plates for perpendicular reciprocating movement with said fixtures and normally being urged into contact with one another and presenting cutting edges for trimming the film ends passing over them when they are reciprocated in this manner with the fixtures; whereby the film ends may be trimmed to place them in abutting relation with one another by reciprocating the fixtures as aforesaid when the plates are in their initial position and the plates may be moved slidably relative to the fixtures away from their initial position and out of the splicing passage to allow a splice to be formed around the trimmed film ends.

16. A film splicer according to claim 15, wherein said plates and said fixtures are pivotally mounted on a substantially common axis in the initial position of said plates for the said perpendicular reciprocating movement together.

17. A film splicer comprising left and right film holding fixtures for positioning the film ends to be spliced in end to end relation and in longitudinal alignment with one another; said fixtures being spaced from one another longitudinally of the film to provide a splicing passage between them; a splicing carriage aligned with said passage transversely of the film ends; said carriage and said fixtures being mounted for relative movement with respect to one another transversely of the film; said carriage having tape folding and wiping means associated therewith for said relative movement and said folding and wiping means having an initial position at one side of the film ends; tape feeding means aligned with said passage at the other side of the film ends and said tape feeding means while remaining at said other side of the film ends being adapted to feed pressure sensitive splicing tape from a tape supply in cantilever fashion transversely over and beyond the surfaces of said film ends with the pressure sensitive side of the tape facing said surfaces; said folding and wiping means being adapted to fold the tape under and around the film ends and press the folded tape into sealing relation with the exposed surfaces of the film ends to form a splice, on relative motion of said carriage with respect to said fixtures; and means for severing the sealed portion of said tape from the tape supply.

18. A film splicer according to claim 17 wherein the tape feeding means includes guide means for imparting a three dimensional cross section to the tape to give the tape sufficient rigidity to allow it to be fed cantilever fashion as aforesaid.

19. A film splicer according to claim 18 wherein the guide means is a track having a C-shaped cross section and the nonadhesive side of the tape rides in the track.

20. A film splicer according to claim 19, wherein said feeding means includes a continuous narrow feeding belt running in the track in the direction the tape is being fed, said belt being in driving contact only with the adhesive side of the tape in a narrow area extending along a portion of the tape length.

21. A film spicer according to claim 20, wherein the belt is driven by pulleys and the last pulley to contact the belt before the tape leaves the belt presents a flange extending radially beyond the belt for progressively separating the tape from the belt without applying tension to the tape or retarding the forward movement imparted to the tape by the belt.

References Cited
UNITED STATES PATENTS

| | | | |
|---|---|---|---|
| 2,246,655 | 6/1941 | Bacon | 156—502 |
| 3,075,572 | 1/1963 | Catozzo | 156—505 |
| 3,155,563 | 11/1964 | Jorgensen | 156—505 |
| 3,167,466 | 1/1965 | Lapersonne | 156—505 |
| 3,318,754 | 5/1967 | Philippi | 156—505 |
| 3,345,238 | 10/1967 | Vanoni | 156—505 |

DOUGLAS J. DRUMMOND, *Primary Examiner.*

U.S. Cl. X.R.

83—598, 660

UNITED STATES PATENT OFFICE
CERTIFICATE OF CORRECTION

Patent No. 3,434,907                         March 25, 1969

George J. Philippi et al.

It is certified that error appears in the above identified patent and that said Letters Patent are hereby corrected as shown below:

Column 13, line 6, cancel "passage", second occurrence; line 51, "take" should read -- tack --. Column 18, line 24, after "film" insert -- ends; said carriage --. Column 19, line 42, after "cutters" insert -- with --.

Signed and sealed this 7th day of April 1970.

(SEAL)
Attest:

Edward M. Fletcher, Jr.                     WILLIAM E. SCHUYLER, JR.
Attesting Officer                             Commissioner of Patents